(12) United States Patent
Takeuchi et al.

(10) Patent No.: US 6,438,993 B2
(45) Date of Patent: Aug. 27, 2002

(54) EJECTOR CYCLE SYSTEM

(75) Inventors: Hirotsugu Takeuchi, Nagoya; Yoshitaka Kume, Kariya; Hiroshi Oshitani, Toyota; Gota Ogata, Kariya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/872,379

(22) Filed: Jun. 1, 2001

(30) Foreign Application Priority Data

| Jun. 1, 2000 | (JP) | 2000-164884 |
| Feb. 15, 2001 | (JP) | 2001-038998 |
| Apr. 11, 2001 | (JP) | 2001-113076 |
| Apr. 25, 2001 | (JP) | 2001-128034 |
| Apr. 25, 2001 | (JP) | 2001-128035 |

(51) Int. Cl.$^7$ ............................................... F25B 1/06
(52) U.S. Cl. ............................................ 62/500; 62/191
(58) Field of Search ...................... 62/175, 500, 116, 62/191

(56) References Cited

U.S. PATENT DOCUMENTS

| 3,277,660 A | * | 10/1966 | Kemper et al. | 62/500 |
| 3,447,339 A | * | 6/1969 | Rietdijk | 62/500 |
| 3,496,735 A | * | 2/1970 | Haisma | 62/500 |
| 3,670,519 A | * | 6/1972 | Newton | 62/116 |
| 3,680,327 A | | 8/1972 | Stein | |
| 3,701,264 A | * | 10/1972 | Newton | 62/191 |
| 3,838,002 A | | 9/1974 | Gluntz et al. | |
| 4,918,937 A | | 4/1990 | Fineblum | |
| 5,309,736 A | | 5/1994 | Kowalski et al. | |
| 5,343,711 A | * | 9/1994 | Kornhauser et al. | 62/116 |

FOREIGN PATENT DOCUMENTS

| EP | 0 487 002 A2 | 5/1992 |
| WO | WO 98/50703 | 11/1998 |

* cited by examiner

Primary Examiner—William C. Doerrler
(74) Attorney, Agent, or Firm—Harness, Dickey & Pierce, PLC

(57) ABSTRACT

In an ejector cycle system, a mixing portion of an ejector has a length in a refrigerant flow direction and an equivalent diameter, and a ratio of the length to the equivalent diameter of the mixing portion is equal to or smaller than 120. Further, a ratio of the equivalent diameter of the mixing portion to an equivalent diameter at an outlet of a nozzle of the ejector is in a range of 1.05–10. Accordingly, the ejector cycle system operates while a high ejector efficiency is maintained.

50 Claims, 20 Drawing Sheets

$\theta_{n1}$ : 0.05~20°
$\theta_{n2}$ : 0.05~17.5°

$\theta_n$ : 0.05~20°

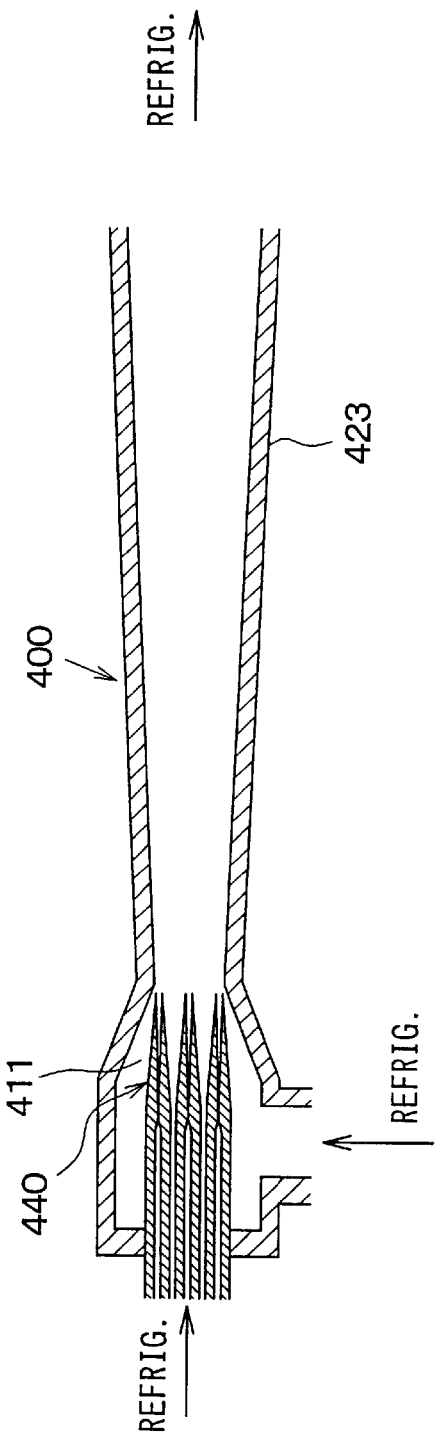
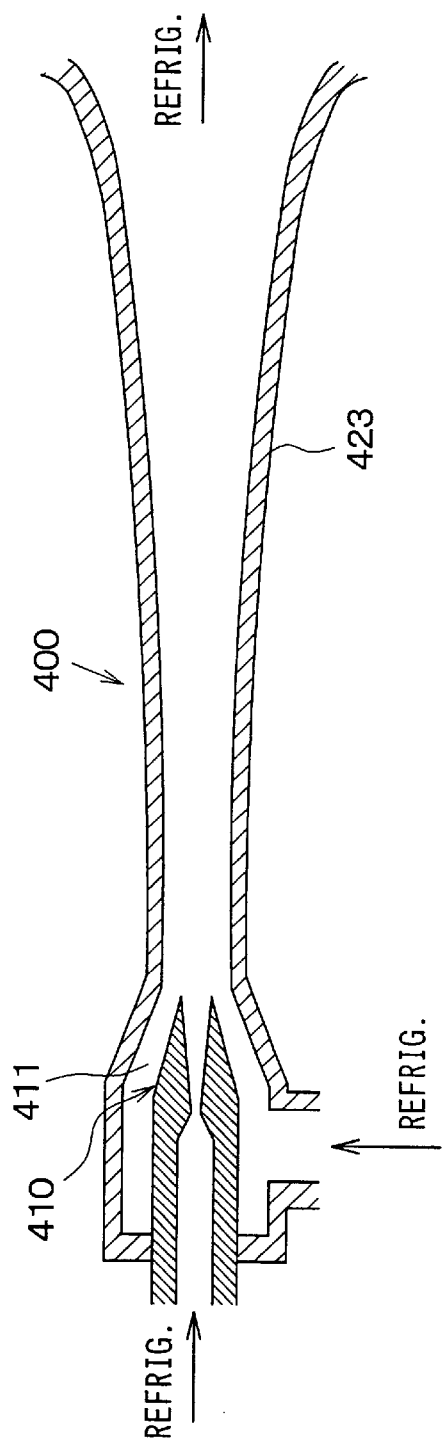

EJECTOR CYCLE SYSTEM

CROSS-REFERENCE TO RELATED APPLICATION

This application is related to Japanese Patent Applications No. 2000-164884 filed on Jun. 1, 2000, No. 2001-38998 filed on Feb. 15, 2001, No. 2001-113076 filed on Apr. 11, 2001, No. 2001-128034 filed on Apr. 25, 2001, and No. 2001-128035 filed on Apr. 25, 2001, the contents of which are hereby incorporated by reference.

BACKGROUND OF THE INVENTION

1. Field of the Invention

The present invention relates to an ejector cycle system having an ejector. In the ejector, high-pressure side refrigerant is decompressed and expanded so that gas refrigerant evaporated in an evaporator is sucked therein, and a refrigerant pressure to be sucked into a compressor is increased by converting an expansion energy to a pressure energy.

2. Description of Related Art

In an ejector cycle system, when an ejector efficiency $\eta e$ is low, a refrigerant cycle efficiency is decreased. For example, JP-A-57-129360 discloses an ejector, where a diameter of a mixing portion is 3–7 mm, a length of the mixing portion is 8–12 times of the diameter of the mixing portion, an extension angle of a diffuser is 4–6 degrees, and a length of the diffuser is 10–14 times of the length of the mixing portion. This ejector is tested and studied by the present inventors, but sufficient ejector efficiency $\eta e$ cannot be obtained.

SUMMARY OF THE INVENTION

In view of the foregoing problems, it is an object of the present invention to provide an ejector cycle system which improves an ejector efficiency.

It is an another object of the present invention to provide an ejector cycle system which improves a refrigerating capacity (heat-absorbing capacity) in an evaporator.

According to the present invention, in an ejector cycle system, an ejector includes a nozzle in which a pressure energy of high-pressure side refrigerant flowing from a radiator is converted to a speed energy so that refrigerant is decompressed and expanded, and a pressure-increasing portion in which the speed energy is converted to a pressure energy so that the pressure of refrigerant is increased while refrigerant discharged from the nozzle and refrigerant sucked from an evaporator are mixed. The nozzle is a divergent nozzle having therein a throat portion at which a passage sectional area becomes smallest in a refrigerant passage of the divergent nozzle. Further, the divergent nozzle has a first dimension between the throat portion and an outlet of the nozzle and a second dimension between the throat portion and an upstream portion upstream from the throat portion, from which the passage sectional area becomes smaller in the refrigerant passage of the divergent nozzle, and the first dimension is larger than the second dimension. The pressure-increasing portion has a length in a refrigerant flow direction and a smallest equivalent diameter, a ratio of the length to the smallest equivalent diameter is equal to or smaller than 120, and a ratio of the smallest equivalent diameter of the pressure-increasing portion to an equivalent diameter at the outlet of the nozzle is in a range of 1.05–10. In this case, the ejector cycle system operates while a high ejector efficiency can be maintained.

Preferably, the pressure-increasing portion has a shape so that refrigerant changes substantially along an isentropic curve from a refrigerant inlet to a refrigerant outlet of the pressure-increasing portion. Accordingly, the ejector efficiency can be further improved.

Further, the pressure-increasing portion has a refrigerant passage with a passage section area, and the passage sectional area is approximately constant from an upstream side to a downstream side in the refrigerant passage of the pressure-increasing portion. Alternatively, the passage sectional area is gradually increased from an upstream side to a downstream side in the refrigerant passage of the pressure-increasing portion. Accordingly, the structure of the pressure-increasing portion can be made simple, and the ejector is readily manufactured in low cost.

According to the present invention, in an ejector cycle system, an ejector includes a nozzle in which a pressure energy of high-pressure side refrigerant flowing from a radiator is converted to a speed energy so that refrigerant is decompressed and expanded, a mixing portion in which gas refrigerant evaporated in an evaporator is sucked by a high-speed refrigerant flow ejected from the nozzle to be mixed with refrigerant ejected from the nozzle, and a diffuser in which the speed energy is converted to the pressure energy so that the pressure of refrigerant is increased. The mixing portion has a length in a refrigerant flow direction and an equivalent diameter, and a ratio of the length to the equivalent diameter is equal to or smaller than 120. Further, a ratio of the equivalent diameter of the mixing portion to an equivalent diameter at the outlet of the nozzle is in a range of 1.05–10. In this case, the ejector efficiency more than 20% can be maintained.

Preferably, the refrigerant is carbon dioxide, the ratio of the equivalent diameter of the mixing portion to the equivalent diameter at the outlet of the nozzle is in a range of 1.3–5.3. In this case, the ejector cycle system can operate while the ejector efficiency more than 40% is maintained.

Preferably, the refrigerant is freon, and the ratio of the equivalent diameter of the mixing portion to the equivalent diameter at the outlet of the nozzle is in a range of 1.05–4.5. In this case, the ejector cycle system can operate while the ejector efficiency more than 20% is maintained.

The diffuser has a refrigerant passage with a passage section area, the passage sectional area is gradually increased from an upstream side to a downstream side in the refrigerant passage of the diffuser, the diffuser has an extension angle $\theta d$ which is defined by an inside wall surface of the diffuser and a reference line parallel to a center axial line of the diffuser, and the extension angle ed of the diffuser is in a range of 0.2–34 degrees. More preferably, the extension angle ed of the diffuser is in a range of 0.2–7 degrees. Accordingly, the ejector efficiency can be further improved.

Preferably, the nozzle has a shape so that refrigerant changes substantially along an isentropic curve from a refrigerant inlet to a refrigerant outlet of the nozzle. Accordingly, even when the refrigerant is a mixing refrigerant such as HFC-404A, HFC-407, HFC-410, because refrigerant changes in the ejector substantially along the isentropic curve, the dryness of refrigerant flowing from the ejector into a gas-liquid separator becomes smaller. Accordingly, even when the mixing refrigerant is used as the refrigerant in the ejector cycle system, a ratio of gas refrigerant contained in refrigerant supplied into the evaporator from the gas-liquid separator becomes smaller, a pressure loss generated while refrigerant is supplied from the gas-liquid separator to the evaporator can be made smaller, and refrigerating capacity (heat-absorbing capacity) of the evaporator can be improved.

According to the present invention, in an ejector cycle system, a nozzle of an ejector has a refrigerant ejecting port from which refrigerant is ejected, the nozzle is connected to a gas-liquid separator in such a manner that, within the gas-liquid separator, gas refrigerant in the evaporator is sucked by a high-speed refrigerant flow ejected from the nozzle, and the speed energy of refrigerant is converted to the pressure energy while refrigerant discharged from the nozzle and refrigerant sucked from the evaporator are mixed. Alternatively, a refrigerant outlet side of a mixing portion of an ejector is connected to the gas-liquid separator in such a manner that, within the gas-liquid separator, the speed energy of refrigerant flowing from the mixing portion is converted to the pressure energy to increase refrigerant pressure. Because the nozzle or the mixing portion of an ejector is integrally connected with the gas-liquid separator, the size of the ejector cycle system can be made smaller, and the elector can be manufactured in low cost.

According to the present invention, in an ejector cycle system, an ejector includes a first nozzle in which a pressure energy of high-pressure side refrigerant flowing from the radiator is converted to a speed energy so that refrigerant is decompressed and expanded, a second nozzle disposed around the first nozzle in such a manner that refrigerant from the evaporator is sucked and is ejected by a refrigerant flow ejected from the first nozzle, and a pressure-increasing portion in which the speed energy is converted to the pressure energy so that the pressure of refrigerant is increased while refrigerant ejected from the first nozzle and refrigerant ejected from the second nozzle are mixed. The first nozzle has a first injecting port from which refrigerant from a radiator is injected, the second nozzle has a second injecting port from which refrigerant from the evaporator is injected, and the first injecting port and the second injecting port are provided at an approximately equal position in a refrigerant passage of the ejector in a refrigerant flow direction. Accordingly, the ejector cycle performance can be improved.

According to the present invention, in an ejector cycle system, an ejector includes a nozzle in which a pressure energy of high-pressure side refrigerant flowing from a radiator is converted to a speed energy so that refrigerant is decompressed and expanded, a mixing portion in which gas refrigerant evaporated in an evaporator is sucked by a high-speed refrigerant flow ejected from the nozzle to be mixed with refrigerant ejected from the nozzle, and a diffuser in which the speed energy is converted to the pressure energy so that the pressure of refrigerant is increased. The ejector is constructed in such a manner that refrigerant from the mixing portion flows into the diffuser after a flow rate of refrigerant sucked from the evaporator and a flow rate of refrigerant ejected from the nozzle becomes approximately equal in the mixing portion. Accordingly, in the ejector, refrigerant pressure can be sufficiently increased in the mixing portion and the diffuser, and the ejector efficiency can be improved.

According to the present invention, in an ejector cycle system, an ejector is constructed so that a pressure-increasing ratio of a pressure-increasing amount in a mixing portion to an entire pressure-increasing amount in the ejector is set to be equal to or larger than 50% when carbon dioxide is used as refrigerant. Preferably, the pressure-increasing ratio of the pressure-increasing amount in the mixing portion to the entire pressure-increasing amount in the ejector is set in a range of 55–80% when carbon dioxide is used as refrigerant. In this case, the ejector efficiency can be improved.

Alternatively, an ejector is constructed so that a pressure-increasing ratio of a pressure-increasing amount in a mixing portion to an entire pressure-increasing amount in the ejector is set to be equal to or larger than 30% when freon is used as refrigerant. Preferably, the pressure-increasing ratio of the pressure-increasing amount in the mixing portion to the entire pressure-increasing amount in the ejector is set in a range of 35–80% when freon is used as refrigerant. In this case, the ejector efficiency can be also improved.

BRIEF DESCRIPTION OF THE DRAWINGS

Additional objects and advantages of the present invention will be more readily apparent from the following detailed description of preferred embodiments when taken together with the accompanying drawings, in which:

FIG. 15 is a schematic diagram showing an ejector of an ejector cycle system according to an eighth preferred embodiment of the present invention;

FIG. 16 is a schematic diagram showing an ejector of an ejector cycle system according to a ninth preferred embodiment of the present invention;

DETAILED DESCRIPTION OF THE PRESENTLY PREFERRED EMBODIMENTS

Preferred embodiments of the present invention will be described hereinafter with reference to the accompanying drawings.

A first preferred embodiment of the present invention will be now described with reference to FIGS. 1–6. In the first embodiment, an ejector cycle system of the present invention is typically used for a reference cycle using carbon dioxide as refrigerant, for a vehicle air conditioner.

Figure 1:
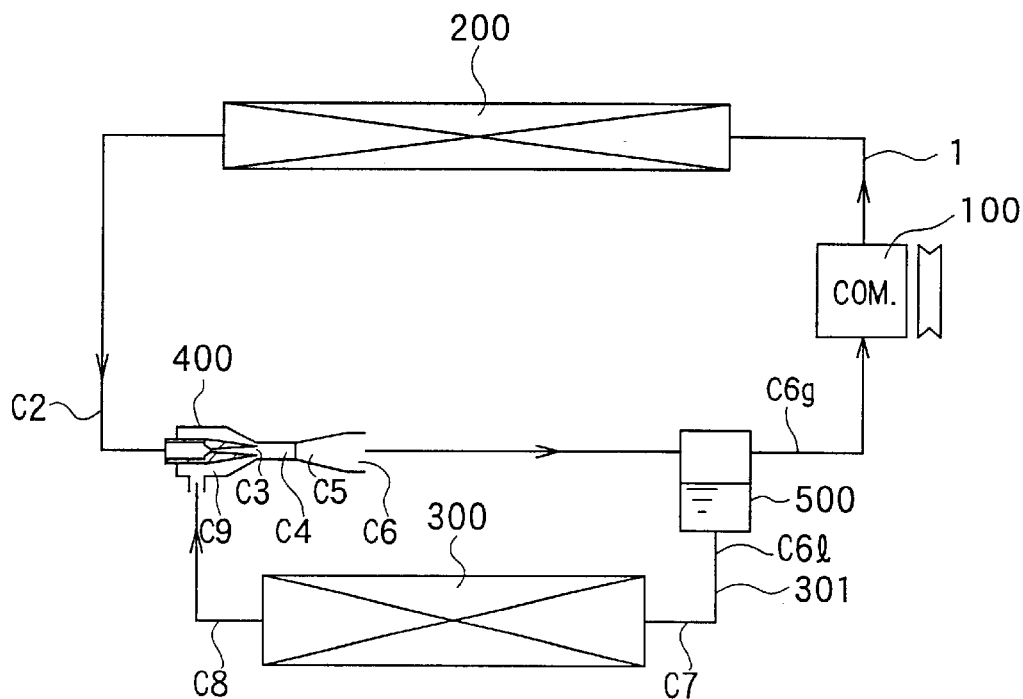
FIG. 1 is a schematic diagram of an ejector cycle system according to a first preferred embodiment of the present invention.

As shown in FIG. 1, a compressor 100, which sucks and compresses refrigerant using a driving force from a driving source such as a vehicle engine, is disposed in the ejector cycle system. A radiator 200 (gas cooler) is disposed, so that refrigerant discharged from the compressor 100 is heat-exchanged with outside air outside a passenger compartment and is cooled by outside air.

An evaporator 300 is disposed in the ejector cycle system so that air to be blown into the passenger compartment and liquid refrigerant flowing through the evaporator 300 are heat-exchanged. In the evaporator 300, cooling capacity for cooling air can be obtained by the evaporation of liquid refrigerant. An ejector 400 decompresses and expands refrigerant from the radiator 200 so that gas refrigerant evaporated in the evaporator 300 is sucked therein, and converts an expansion energy to a pressure energy to increase a refrigerant pressure sucked into the compressor 100.

Figure 2:
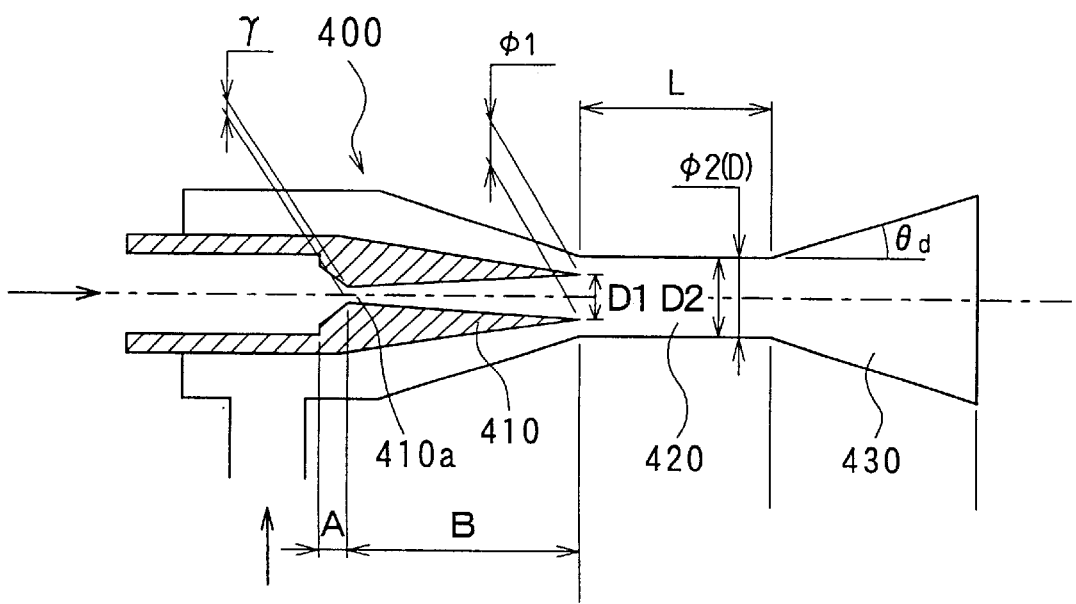
FIG. 2 is an enlarged schematic diagram of an ejector according to the first embodiment.

As shown in FIG. 2, the ejector 400 includes a nozzle 410 which decompresses and expands refrigerant by converting a pressure energy (pressure head) of high-pressure side refrigerant flowing from the radiator 200 to a speed energy (speed head), a mixing portion 420 in which gas refrigerant evaporated in the evaporator 300 is sucked by a high-speed refrigerant flow (jet flow) discharged from the nozzle 410, and a diffuser 430 in which the speed energy is converted to the pressure energy so that the refrigerant pressure to be sucked into the compressor 100 is increased while refrigerant from the nozzle 410 and refrigerant sucked from the evaporator 300 are mixed.

In the first embodiment, opening diameters (passage diameters) of the nozzle 410 and the mixing portion 420 are determined so that an equivalent diameter ratio D2/D1 of an equivalent diameter D2 of the mixing portion 420 to an equivalent diameter D1 of an outlet of the nozzle 410 becomes 1.05 or more. Here, the equivalent diameter is a diameter defined by converting a cross-section area of a refrigerant passage to a circle. In the first embodiment, since the outlet of the nozzle 410 and the mixing portion 420 are circular, the equivalent diameters D1, D2 are the diameter of the outlet of the nozzle 410 and the diameter of the mixing portion 420, respectively.

In the first embodiment, the equivalent diameter D2 of the mixing portion 420 is constant until the diffuser 430. However, the mixing portion 420 can be tapered so that a cross-sectional area S2 of the mixing portion 420 becomes larger toward the diffuser 430. In this case, the equivalent diameter D2 of the mixing portion 420 is defined at the inlet of the mixing portion 420.

The nozzle 410 of the first embodiment includes a throat portion 410a (throttled portion) having a smallest passage area in the refrigerant passage of the nozzle 410. In FIG. 2, "r" indicates a radial dimension of the throat portion 410a. Further, the nozzle 410 is a divergent nozzle in which a dimension B between the throat portion 410a and the outlet of the nozzle 410 is larger than a dimension A between the throat portion 410a and a portion from which the passage area of the nozzle 410 becomes smaller.

In the ejector 400, the pressure of refrigerant discharged from the outlet of the nozzle 410 is increased in a pressure-increasing portion including the mixing portion 420 and the diffuser 430.

In FIG. 1, a gas-liquid separator 500 is disposed so that refrigerant discharged from the ejector 400 flows into the gas-liquid separator 500. The gas-liquid separator 500 stores refrigerant therein, and refrigerant flowing from the ejector 400 is separated into gas refrigerant and liquid refrigerant. The gas refrigerant separated in the gas-liquid separator 500 is sucked into the compressor 100, and the liquid refrigerant separated in the gas-liquid separator 500 is sucked toward the evaporator 300.

A refrigerant passage 301 connecting the gas-liquid separator 500 and the evaporator 300 is provided with a capillary tube or a fixed throttle, so that refrigerant flowing from the gas-liquid separator 500 toward the evaporator 300 is decompressed. By this decompression in the refrigerant passage 301, pressure (evaporation pressure) within the evaporator 300 can be sufficiently reduced.

Next, operation of the ejector cycle system according to the first embodiment will be now described. When the compressor 100 operates, gas refrigerant is sucked from the gas-liquid separator 500 into the compressor 100, and compressed refrigerant is discharged to the radiator 200. Refrigerant is cooled in the radiator 200, and flows into the ejector 400. Refrigerant from the radiator 200 is decompressed and expanded in the nozzle 410 of the ejector 400, and gas refrigerant in the evaporator 300 is sucked into the mixing portion 420 by the high-speed refrigerant flow from the nozzle 410. While gas refrigerant sucked from the evaporator 300 and refrigerant ejected from the nozzle 410 are mixed in the mixing portion 420, the dynamic pressure (speed energy) of refrigerant is covered to the static pressure (pressure energy) of refrigerant in the diffuser 430. Thereafter, refrigerant from the diffuser 430 of the ejector 400 flows into the gas-liquid separator 500.

On the other hand, because refrigerant within the evaporator 300 is sucked into the ejector 400, liquid refrigerant in the gas-liquid separator 500 flows into the evaporator 300 and evaporates in the evaporator 300 by absorbing heat from air to be blown into the passenger compartment.

Figure 3:
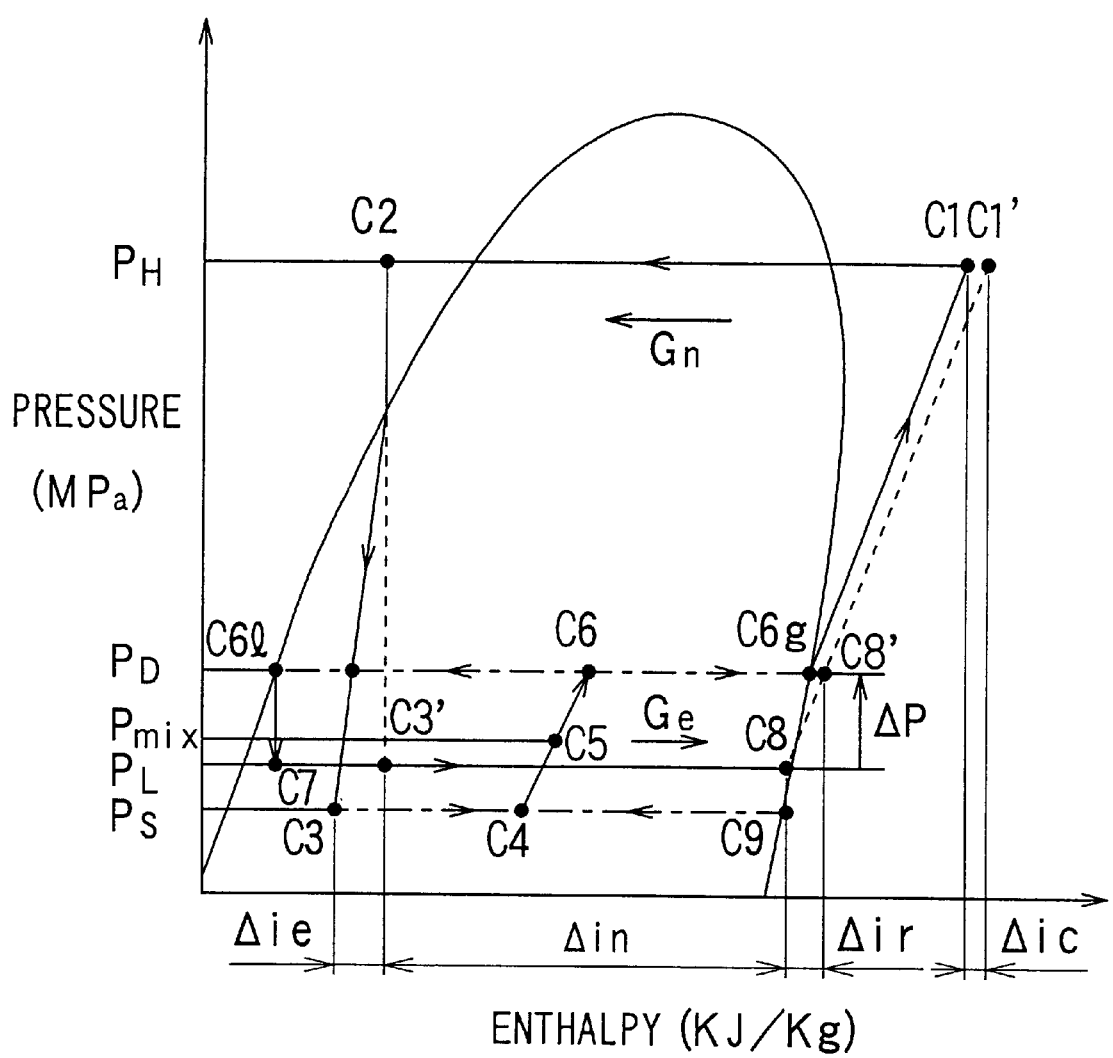
FIG. 3 is a Mollier diagram (p-h diagram) of the ejector cycle system according to the first embodiment.

FIG. 3 is a Mollier diagram (p-h diagram) showing operation of the ejector cycle system according to the first embodiment. In FIG. 3, refrigerant states at different positions (e.g., C1, C2 . . . ) shown in FIG. 1 are indicated. An increased pressure ΔP of suction refrigerant pressure of the compressor 100 is changed in accordance with operation efficiency of the mixing portion 420 and the diffuser 430, and becomes larger as a specific enthalpy difference Δie (adiabatic heat drop) between refrigerant at a refrigerant inlet (point shown by C2 in FIG. 1) of the nozzle 410 and refrigerant at a refrigerant inlet (point shown by C3 in FIG. 1) of the diffuser 430 becomes larger.

Figure 4:
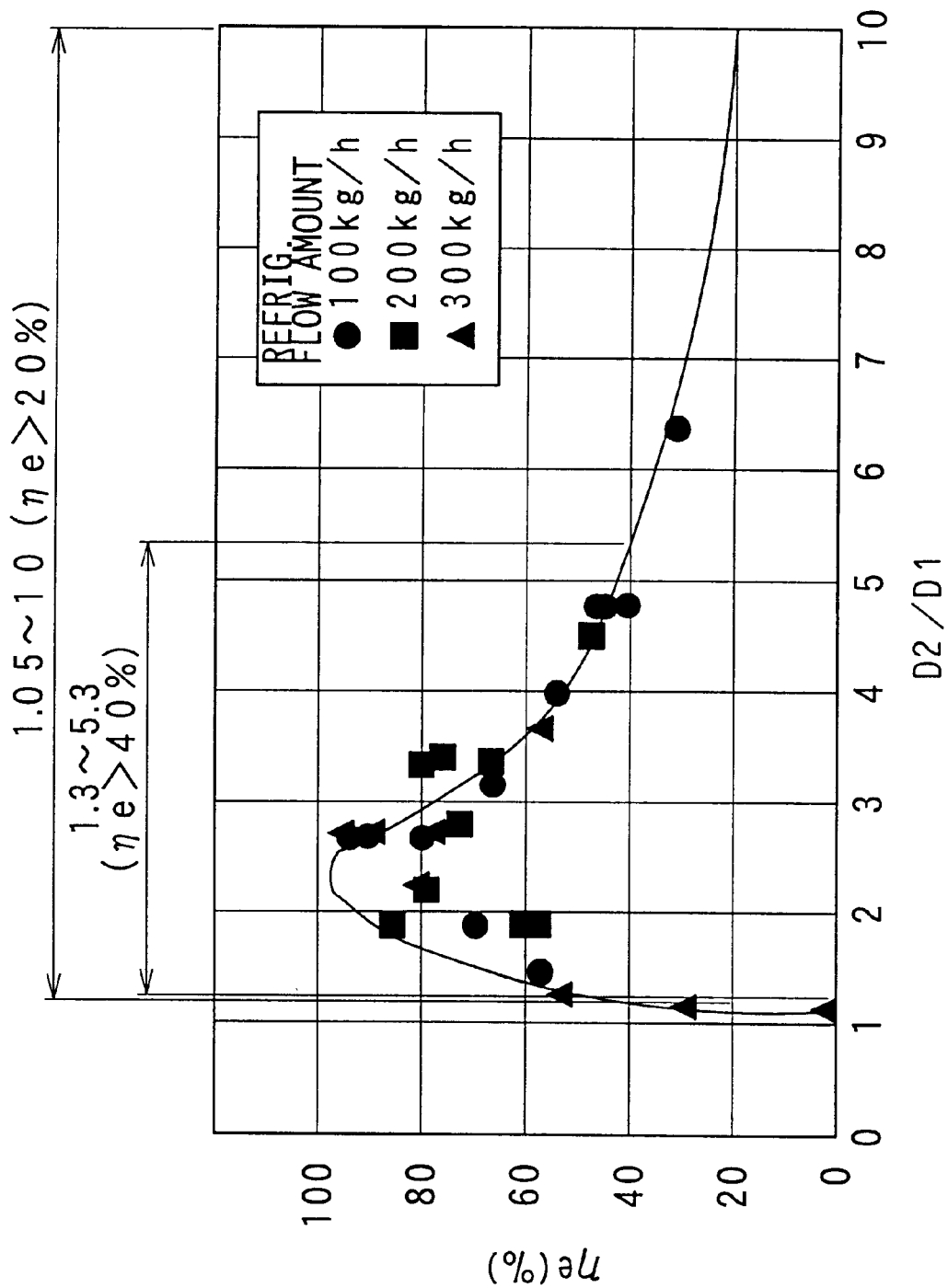
FIG. 4 is a graph showing a relationship between an ejector efficiency $\eta e$ and an equivalent diameter ratio $D2/D1$ in the ejector cyclesystem according to the first embodiment.

Next, features (operational effects) of the ejector cycle system according to the first embodiment will be now described. FIG. 4 is a simulation result of the first embodiment, showing a relationship between an equivalent diameter ratio D2/D1 and ejector efficiency ηe. In FIG. 4, a mass flow amount of refrigerant (hereinafter, referred to as "refrigerant flow amount") is used as a parameter. As shown in FIG. 4, when the equivalent diameter ratio D2/D1 becomes 1.05 or more, the ejector efficiency ηe is rapidly increased. Further, when the equivalent diameter ratio D2/D1 becomes 4 or more, the ejector efficiency ηe is slowly decreased.

Therefore, when the equivalent diameter ratio D2/D1 is 1.05 or more, the ejector cycle system can be operated while high ejector efficiency ηe is maintained (ηe>20%). The equivalent diameter ratio D2/D1 can be set in a range of 1.05–10.

When the equivalent diameter ratio D2/D1 is set in a range of 1.3–5.3, the ejector cycle system can be operated while the ejector efficiency lie is maintained at 40% or more. Therefore, even if outside air temperature is high and coefficient of performance (COP) of the ejector cycle system is liable to be decreased (such as in idling operation), the ejector cycle system of the first embodiment is superior in the COP to a general vapor-compression refrigerant cycle using R134as refrigerant in the COP.

Here, the ejector efficiency ηe is defined as the following formula (1) in consideration of the refrigerant speed energy before being sucked into the ejector 400.

$$\eta_e = [\Delta P(Gn + Ge)/\rho g - Ge(Ue^2/2)]/(\Delta ie \cdot Gn) \quad (1)$$

$$= [(Gn + Ge)\Delta ir - Ge(Ue^2/2)]/(\Delta ie \cdot Gn)$$

wherein, Gn is a refrigerant flow amount flowing in the radiator 200 (high-pressure side heat exchanger), Ge is a refrigerant flow amount flowing in the evaporator 300 (low-pressure side heat exchanger), Δie=i(C2)–i(C3), Δir=i(C8') –i(C8), ΔP=P$_D$–P$_L$, Ue is a suction flow speed of refrigerant, and ρg is a suction flow gas density of refrigerant. Here, i(C2), i(C3), i(C8) and i(C8') are enthalpy at points shown by C2, C3, C8 and C8' in FIG. 1, respectively.

Figure 5:
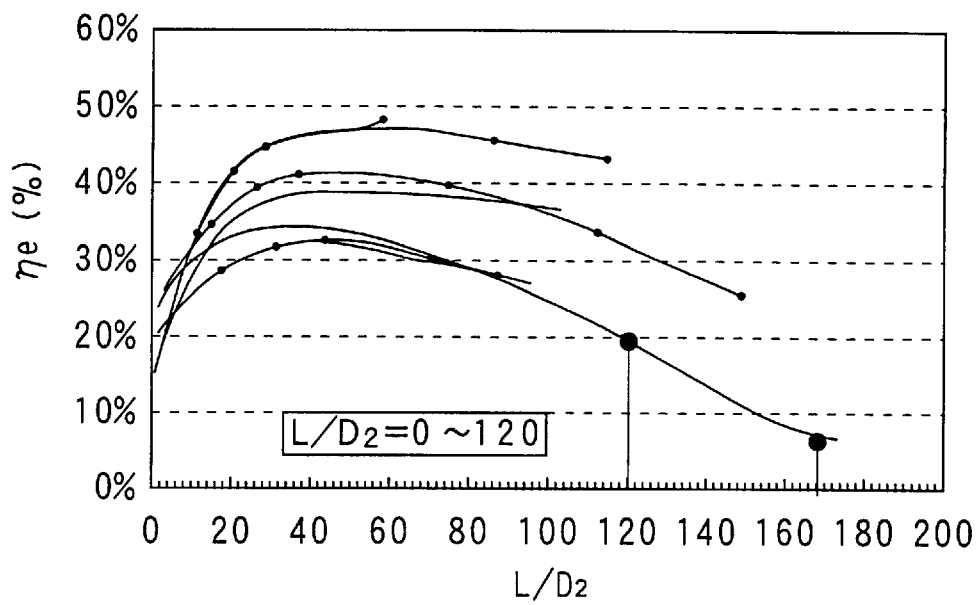
FIG. 5 is a graph showing a relationship between a ratio $L/D2$ of the mixing portion and the ejector efficiency $\eta e$ in the ejector cycle system according to the first embodiment.

FIG. 5 is a simulation result of the first embodiment, showing a relationship between a ratio L/D2 and the ejector efficiency ηe. The ratio L/D2 is a ratio of the length L of the mixing portion 420 to the equivalent diameter D2 of the mixing portion 420. As shown in FIG. 5, when the ratio L/D2 is 170 or less, the ejector efficiency ηe can be maintained at 5% or more in the ejector cycle system using carbon dioxide as refrigerant.

In the first embodiment, the ratio L/D2 for the mixing portion 420 is set at 120 or less, so that the ejector efficiency ηe can be maintained at 20% or more. As shown in FIG. 2, the length L of the mixing portion 420 is a length between a refrigerant outlet of the nozzle 410 and a refrigerant inlet of the diffuser 430.

Figure 6:
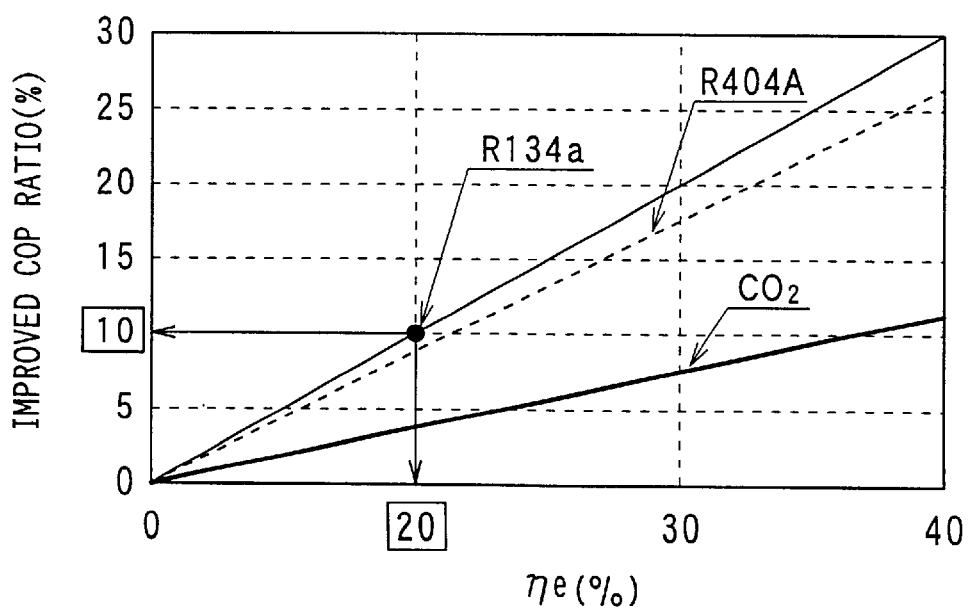
FIG. 6 is a graph showing a relationship between the ejector efficiency $\eta e$ and a performance improved ratio with respect to a simple vapor-compression refrigerant cycle system using an expansion valve, according to the first embodiment.

When the ejector efficiency ηe is maintained at 20% or more, the COP of the ejector cycle system using carbon dioxide as refrigerant can be improved approximately by 3% or more as compared with a simple vapor-compression refrigerant cycle system using a expansion valve, as shown in FIG. 6. Further, the COP of the ejector cycle system using R404A as refrigerant can be improved approximately by 8% or more as compared with the simple vapor-compression refrigerant cycle system. Further, the COP of the ejector cycle system using R134a as refrigerant can be improved approximately by 10% or more as compared with the simple vapor-compression refrigerant cycle system.

The simulations in FIGS. 5, 6 are performed when the outside air temperature is changed in a range of –30 through 55° C. (air temperature around a position where the radiator 200 is disposed) and when the inside air temperature is changed in a range of –30 through 55° C. (air temperature around a position where the evaporator 300 is disposed).

According to the first embodiment, the dimension B is set larger than the dimension A in the nozzle 410, the ratio L/D2 is set to be equal to or smaller than 120, and the ratio D2/D1 is set in a range of 1.05–10. Accordingly, as shown in FIGS. 4 and 5, regardless of the refrigerant flow amount and a refrigerant material, the ejector cycle system can be operated while high ejector efficiency ηe can be maintained.

Figure 7:
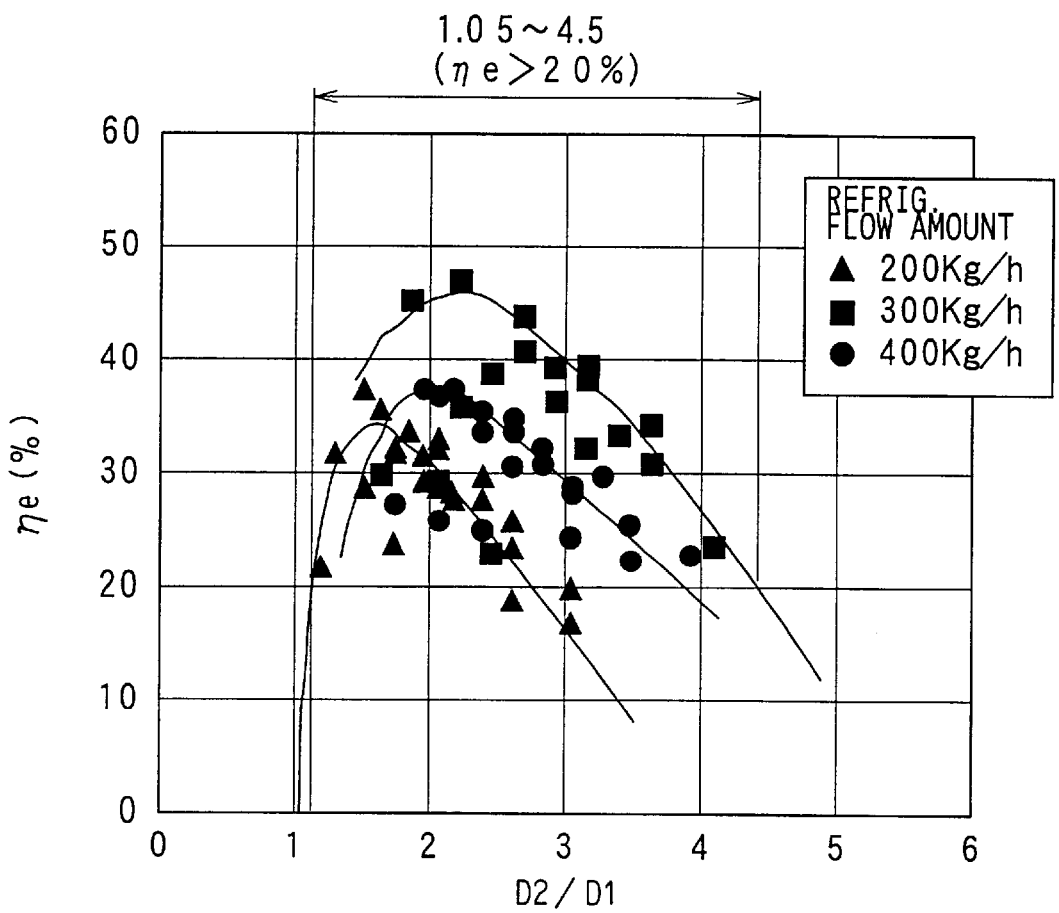
FIG. 7 is a graph showing a relationship between an ejector efficiency $\eta e$ and an equivalent diameter ratio $D2/D1$ in an ejector cycle system according to a second preferred embodiment of the present invention.

A second preferred embodiment of the present invention will be now described with reference to FIG. 7. In the second embodiment, freon HFC-134a (R134a) is used as refrigerant. In this case, as shown in FIG. 7, when the equivalent diameter ratio D2/D1 becomes 1.5 or more, the ejector efficiency ηe is Ser. No. 09/872,379 rapidly improved irrespective of the refrigerant flow amount. Accordingly, in the second embodiment, the ejector efficiency ηe is improved by setting the equivalent diameter ratio D2/D1 in a range of 1.5–4.5.

As shown in FIG. 7, even in the case where freon is used as refrigerant, when the equivalent diameter ratio D2/D1 is set at 1.05 or more, the ejector efficiency ηe can be sufficiently obtained. In the second and following embodiments, the ejector 400 has the ratio LD2 of 120 or less, and a divergent nozzle is used as the nozzle 410 when there is no description on these respects.

A third preferred embodiment of the present invention will be now described with reference to FIG. 8. In the third embodiment, the ejector efficiency ηe is improved by optimizing an extension angle θd of the diffuser 430 (refer to FIG. 2). Specifically, the extension angle θd is set in a range of 0.2 degree and 34 degrees. More preferably, the extension angle θd is set in a range of 0.2–7 degrees. For example, in the third embodiment, the extension angle θd can be set at 6.5 degree.

Figure 8:
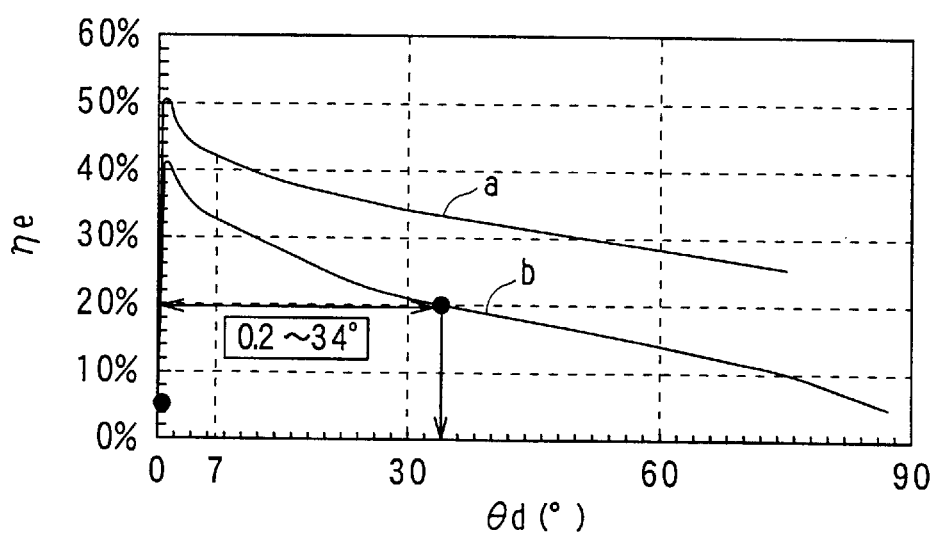
FIG. 8 is a graph showing a relationship between an extension angle $\theta d$ of a diffuser and an ejector efficiency $\eta e$ in an ejector cycle system according to a third preferred embodiment of the present invention.

FIG. 8 is simulation results of the third embodiment, showing a relationship between the extension angle θd of the diffuser 430 and the ejector efficiency ηe. As shown in FIG. 8, when the extension angle θd is in a range of 0.2 degree and 34 degree, the ejector efficiency ηe can be maintained at 20% or more in the ejector cycle system using carbon dioxide as refrigerant.

The simulation in FIG. 8 is performed, when the outside air temperature is changed in a range between −30° C. and 55° C. (air temperature around a position where the radiator 200 is disposed) and when the inside air temperature is changed in a range between −30° C. and 55° C. (air temperature around a position where the evaporator 300 is disposed).

In FIG. 8, the graph "a" shows a simulation result of an ejector cycle system having an inner heat exchanger in which a heat exchange between refrigerant to be sucked into the compressor 100 and refrigerant at an outlet side of the radiator 200 are heat-exchanged. Further, in FIG. 8, the graph "b" shows a simulation result of an ejector cycle system without the inner heat exchanger.

A fourth preferred embodiment of the present invention will be now described with reference to FIGS. 9A, 9B. In the fourth embodiment, the ejector efficiency ηe is improved by optimizing the shape of the nozzle 410. Specifically, a refrigerant passage of the nozzle 410 is formed so that substantially isentropic change occurs in refrigerant within the nozzle 410 from the refrigerant inlet side to the refrigerant outlet side.

Accordingly, because refrigerant can be adiabatically expanded within the nozzle 410, expansion energy can be increased, thereby improving the ejector efficiency ηe. In the diffuser 430, refrigerant pressure can be increased by the expansion energy (energy recovery).

In this specification, the substantially isentropic change occurs in refrigerant within the nozzle 410 from the refrigerant inlet side to the refrigerant outlet side. This substantially isentropic change means that the energy of adiabatic heat drop, generated within the nozzle 410 between the refrigerant inlet side and the refrigerant outlet side, can be converted to kinetic energy by 70% or more.

Figure 9A:
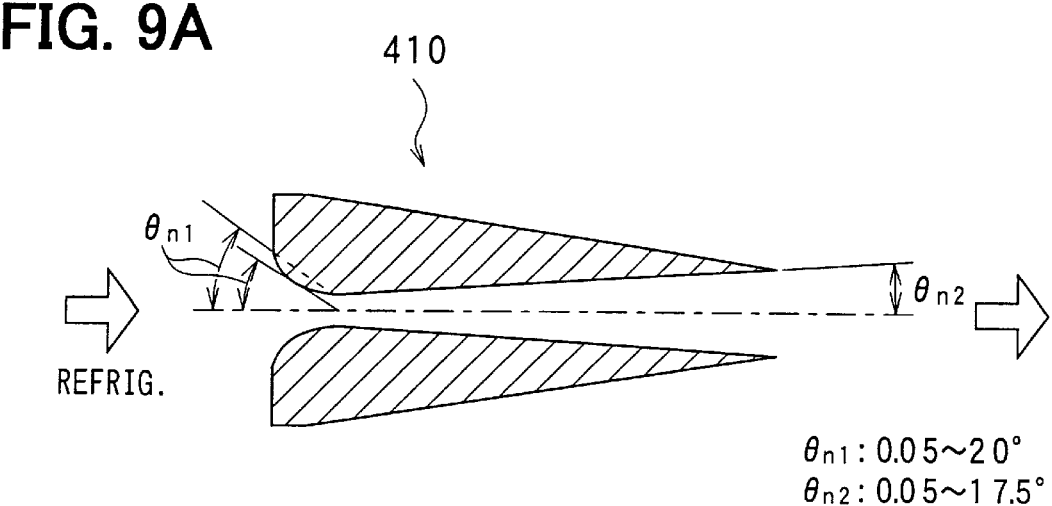
FIGS. 9A, 9B are schematic sectional views each showing a nozzle of an ejector cycle system according to a fourth preferred embodiment of the present invention.
Figure 9B:
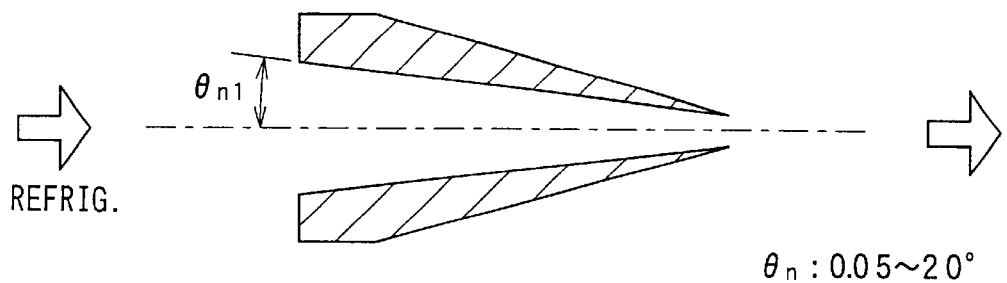

In FIG. 9A, as an example according to the fourth embodiment, the nozzle 410 is a divergent nozzle having a throat portion at which the passage area in the refrigerant passage of the nozzle 410 becomes smallest, and a contraction angle θn1 at the refrigerant inlet side is in a range between 0.05 degree and 20 degree. Further, in FIG. 9A, an extension angle θn2 at the refrigerant outlet side is in a range between 0.05 degree and 17.5 degree. In FIG. 9B, as an another example, the nozzle 410 is a convergent nozzle in which the passage area of the refrigerant passage becomes smaller from the refrigerant inlet side toward the refrigerant outlet side of the nozzle, and the contraction angle θn1 at the refrigerant inlet side is in a range between 0.05 degree and 20 degree.

The nozzle shape is determined by simultaneous equations of the following formulas (2), (3). That is, the formula (2) is a motion equation, and the formula (3) is a mass equation.

$$\eta n \cdot (h1-h2) = (v2^2 - v1^2) \qquad (2)$$

wherein, "h" is specific enthalpy, "v" is a refrigerant flow speed, and ηn is nozzle efficiency.

$$G = \eta c \cdot \rho \cdot v \cdot A \qquad (3)$$

wherein, A is a sectional area, G is a refrigerant flow amount, "ρ" is density, and ηc is a coefficient of a refrigerant flow amount.

Figure 10B:
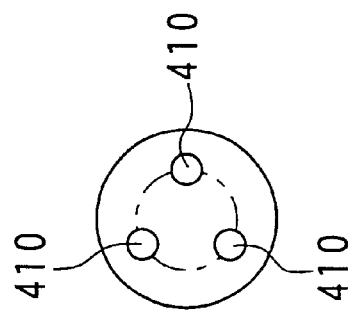
FIG. 10B is a right side view in FIG. 10A.
Figure 10A:
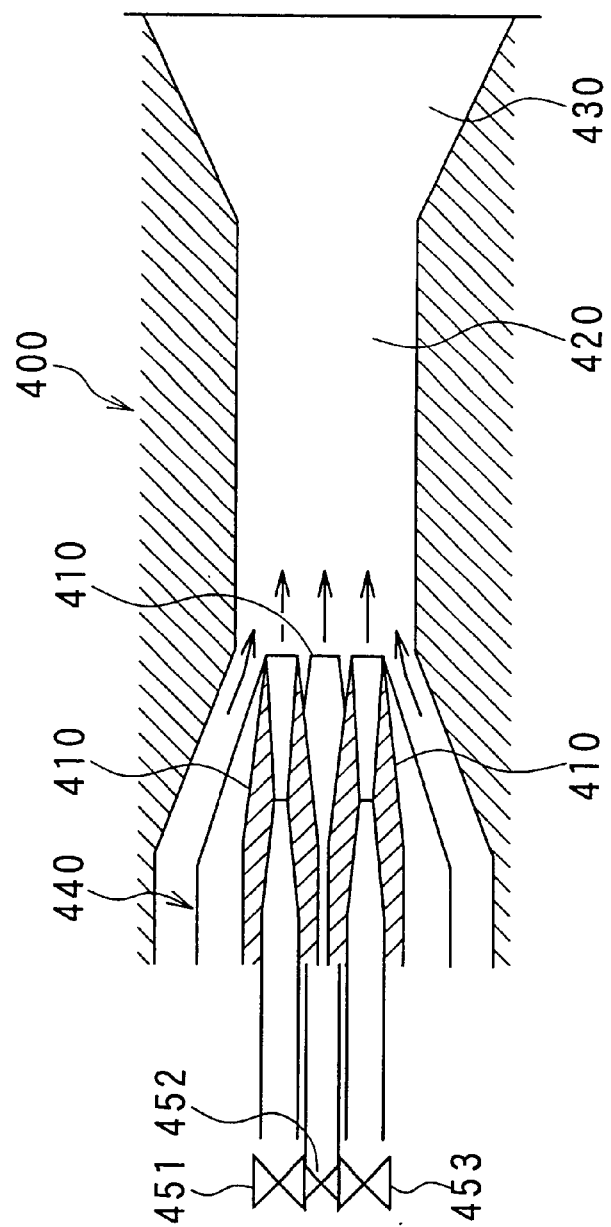
FIG. 10A is a schematic sectional view showing an ejector of an ejector cycle system according to a fifth preferred embodiment of the present invention.

A fifth preferred embodiment of the present invention will be now described with reference to FIGS. 10A, 10B. In the fifth embodiment, as shown in FIGS. 10A, 10B, a nozzle group 440 is constructed by plural (three in the fifth embodiment) nozzles 410 concentrically arranged. Further, valves 451–453 are provided so that flow amounts of refrigerant flowing into the plural nozzles 410 are independently controlled, respectively. A divergent nozzle is used as each nozzle 410, and the ratio L/D is set to be equal to or smaller than 120, in the fifth embodiment.

Each opening degree of the valves 451–453 is controlled in accordance with an operation state of the 25 ejector cycle system. Specifically, when a thermal load of the ejector cycle system increases, the number of the nozzles 410 in which refrigerant flows is increased. Here, the thermal load means a heat absorption capacity required at the evaporator 300 or a heat radiation capacity required at the radiator 200. On the other hand, when the thermal load of the ejector cycle system decreases, the number of the nozzles 410 in which refrigerant flows is decreased.

Since the plural nozzles 410 are concentrically arranged, a size of the nozzle group 440 is prevented from enlarging as compared with a case where the plural nozzles 410 are arranged in a line. Further, in the fifth embodiment, a contact area between a driving refrigerant flow ejected from the nozzle group 440 and a suction refrigerant flow sucked from the evaporator 300 into the ejector 400 can be increased. Accordingly, the suction refrigerant flow can be accurately sucked into the ejector 400, thereby improving a mixing performance between the suction refrigerant flow and the driving refrigerant flow.

Figure 11A:
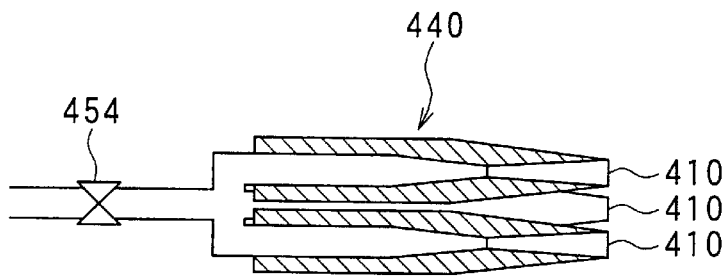
FIGS. 11A, 11B are schematic sectional views each showing a nozzle of an ejector cycle system according to a sixth preferred embodiment of the present invention.
Figure 11B:
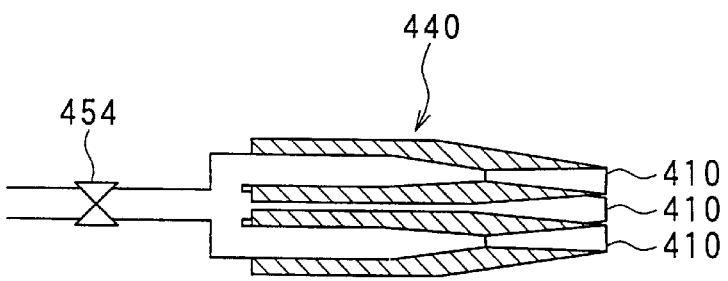

A sixth preferred embodiment of the present invention will be now described with reference to FIGS. 11A and 11B. In the sixth embodiment, as shown in FIGS. 11A and 11B, a nozzle group 440 is constructed by plural (three in the sixth embodiment) nozzles 410 concentrically arranged. Further, a valve 454 is provided so that a flow amount of refrigerant flowing into the nozzle group 440 is controlled. A divergent nozzle is used as the nozzle 410, and the ratio L/D is set to be equal to or smaller than 120, in the sixth embodiment.

In the sixth embodiment, when a thermal load of the ejector cycle system increases, the opening degree of the valve 454 is increased, thereby increasing the refrigerant flow amount flowing into the nozzle group 440. On the contrary, when the thermal load of the ejector cycle system decreases, the opening degree of the valve 454 is decreased, thereby decreasing the refrigerant flow amount flowing into the nozzle group 440.

Accordingly, in the sixth embodiment, the number of valves for controlling the refrigerant flow amount can be reduced as compared with the fifth embodiment where each of the plural nozzles 410 is independently controlled. In FIG. 11A, as an example according to the sixth embodiment, the nozzles 410 are arranged so that refrigerant flow axial lines from the nozzles 410 are substantially parallel to each other. In FIG. 11B, as another example according to the sixth embodiment, the nozzles 410 are arranged so that refrigerant flow axial lines from the nozzles 410 substantially cross with each other.

Figure 12:
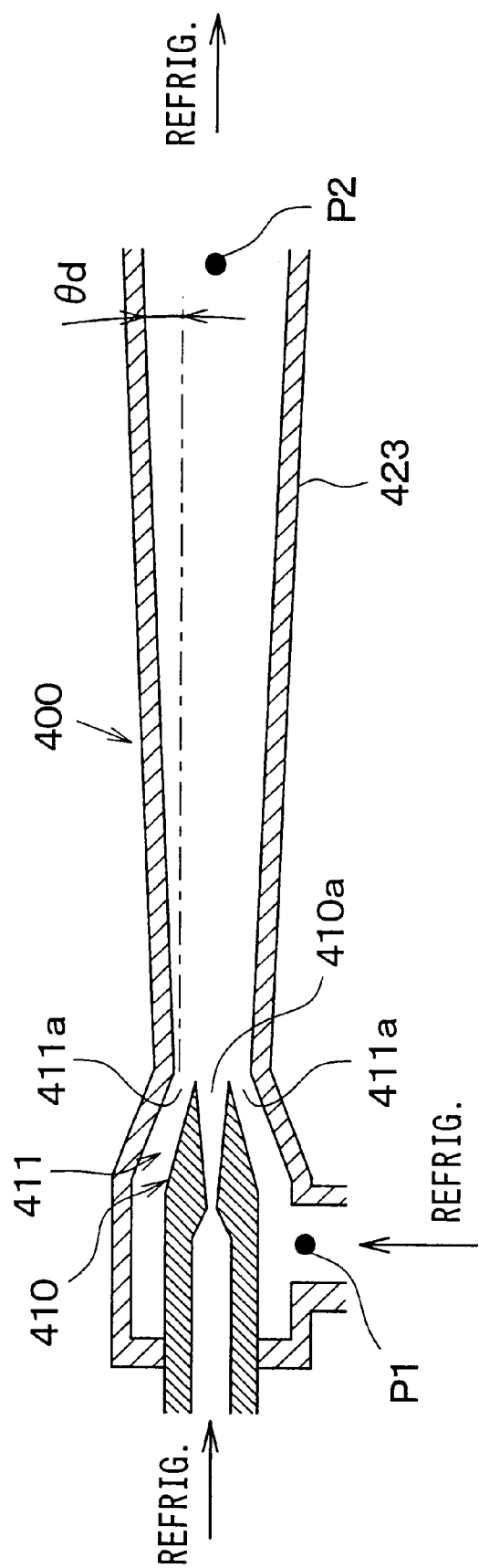
FIG. 12 is a schematic sectional view showing an ejector in an ejector cycle system according to a seventh preferred embodiment of the present invention.

A seventh preferred embodiment of the present invention will be now described with reference to FIGS. 12–14. In the above-described embodiments, the pressure-increasing portion is definitely separated into the mixing portion 420 and the diffuser 430. However, in the seventh embodiment, as shown in FIG. 12, the mixing portion 420 and the diffuser 430 are integrally formed to form a pressure-increasing portion 423 in which the refrigerant pressure is increased (recovered) while refrigerant (driving refrigerant flow) jetted from the nozzle 410 and refrigerant (suction refrigerant flow) sucked from the evaporator 300 are mixed. In the pressure-increasing portion 423, the sectional area of the refrigerant passage increases from an upstream side toward a downstream side.

Figure 13:
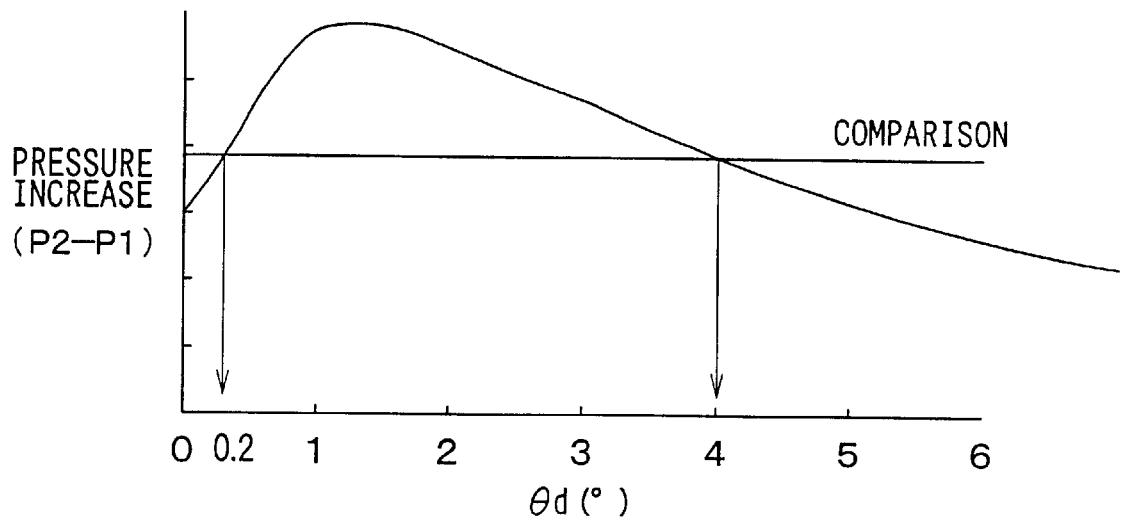
FIG. 13 is a graph showing a relationship between an extension angle $\theta d$ of a pressure-increasing portion and a pressure increase amount (P2-P1) in the ejector, according to the seventh embodiment.

FIG. 13 is a simulation result showing a relationship between an extension angle θd of the pressure-increasing portion 423 and a pressure increase amount (P2-P1) in the ejector 400. Here, the pressure increase amount is pressure difference (P2-P1) between refrigerant pressure P2 at the refrigerant outlet of the ejector 400 (pressure-increasing portion 423) and refrigerant pressure P1 sucked from the evaporator 300 into the ejector 400. As shown in FIG. 13, when the extension angle θd is in a range of 0.2 degree and 4 degree (preferably, 1.2 degree), an increased pressure amount can be equal to or larger than that of the above-described embodiments where the mixing portion 420 and the diffuser 430 are definitely separated from each other in the ejector 400.

Here, a simulation condition is the same as that in the fourth and fifth embodiments. As shown in FIG. 12, the extension angle θd is defined by an inside wall surface of the pressure-increasing portion 423 and a reference line parallel to a center axial line of the pressure-increasing portion 423.

In the seventh embodiment, the mixing portion 420 and the diffuser 430 can be integrally formed while a sufficient function (pressure-increasing performance) is obtained. Therefore, the structure of the ejector 400 can be simplified, thereby reducing manufacturing cost of the ejector 400.

Figure 14:
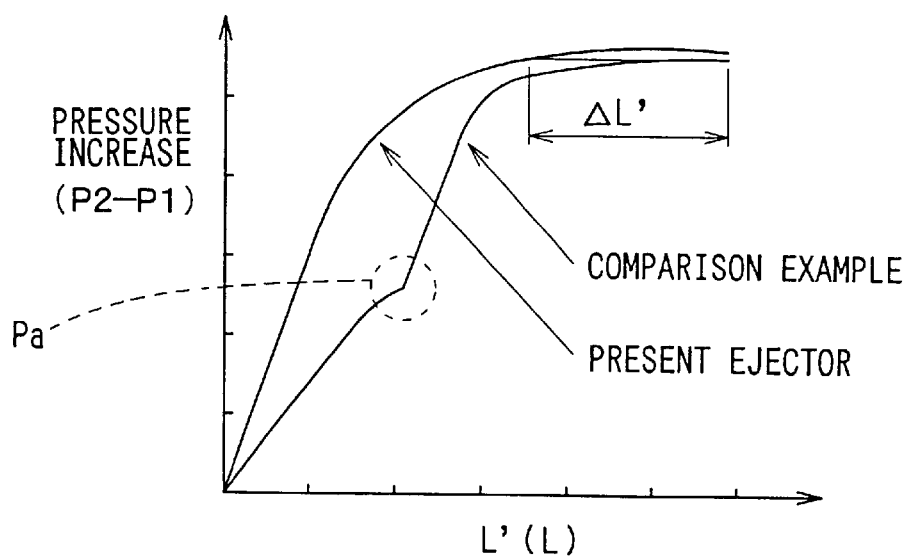
FIG. 14 is a graph showing a relationship between the pressure increase amount (P2-P1) in the ejector and a distance L' of the pressure-increasing portion, according to the seventh embodiment.

FIG. 14 is a graph (simulation results) showing a relationship between an increased pressure (P2-P1) and a distance L' from a refrigerant inlet to a refrigerant outlet of the pressure-increasing portion 423 of the ejector 400 of the seventh embodiment, and a relationship between an increased pressure (P2-P1) and a distance L from a refrigerant inlet to a refrigerant outlet of the mixing portion 420 of a comparison example where the mixing portion 420 and the diffuser 430 are definitely separated from each other. As shown in FIG. 14, pressure loss Pa occurs at a connection portion between the mixing portion 420 and the diffuser 430 in the comparison example. Therefore, the diffuser 430 is required to be sufficiently enlarged in order to increase refrigerant pressure to the same pressure as in the ejector 400 according to the seventh embodiment.

That is, in the ejector 400 according to the seventh embodiment, even if the pressure-increasing portion 423 (i.e., the ejector 400) is shortened by a shortened distance ΔL' as compared with the comparison example, a refrigerant pressure more than that in the comparison example can be obtained, thereby reducing the size of the ejector 400.

As shown in FIG. 13, even when the extension angle θd is zero, that is, the refrigerant passage sectional area of the pressure-increasing portion 423 is substantially constant, the refrigerant pressure can be increased (recovered) while the driving refrigerant flow and the suction refrigerant flow are mixed.

In the ejector cycle system, as shown in FIG. 12, a suction nozzle 411 for jetting the suction refrigerant flow is coaxially disposed with respect to the nozzle 410 for jetting the driving refrigerant flow. Further, refrigerant jetting ports 410a, 411a of the both nozzles 410, 411 are preferably disposed at the substantially same positions, for example, at an inlet portion of the pressure-increasing portion 423 in the seventh embodiment.

Even in the ejector 400 of the seventh embodiment, the nozzle 410 can be formed by the divergent nozzle. Further, when the pressure-increasing portion 423 has a length L' in the refrigerant flow direction and a smallest equivalent diameter D2, a ratio of the length L' to the smallest equivalent diameter D2 can be set equal to or smaller than 120, and a ratio of the smallest equivalent diameter D2 of the pressure-increasing portion 423 to an equivalent diameter D1 at the outlet of the nozzle 410 can be set in a range of 1.05–10. In this case, similarly to the first embodiment, the ejector efficiency ηe can be improved.

Next, an eighth preferred embodiment of the present invention will be now described with reference to FIG. 15. As shown in FIG. 15, the eighth embodiment is a combination of the sixth and seventh embodiments. Specifically, the nozzle group 440 formed by the plural nozzles 410 is used, and the integrated pressure-increasing portion 423 is formed in the ejector 400.

Next, a ninth preferred embodiment of the present invention will be now described with reference to FIG. 16. In the ninth embodiment, as shown in FIG. 16, the pressure-increasing portion 423 is formed so that the substantially isentropic change occurs in refrigerant within the pressure-increasing portion 423 from the refrigerant inlet side to the refrigerant outlet side. Accordingly, refrigerant can be adiabatically expanded within the pressure-increasing portion 423, thereby improving the ejector efficiency ηe.

Figure 17:
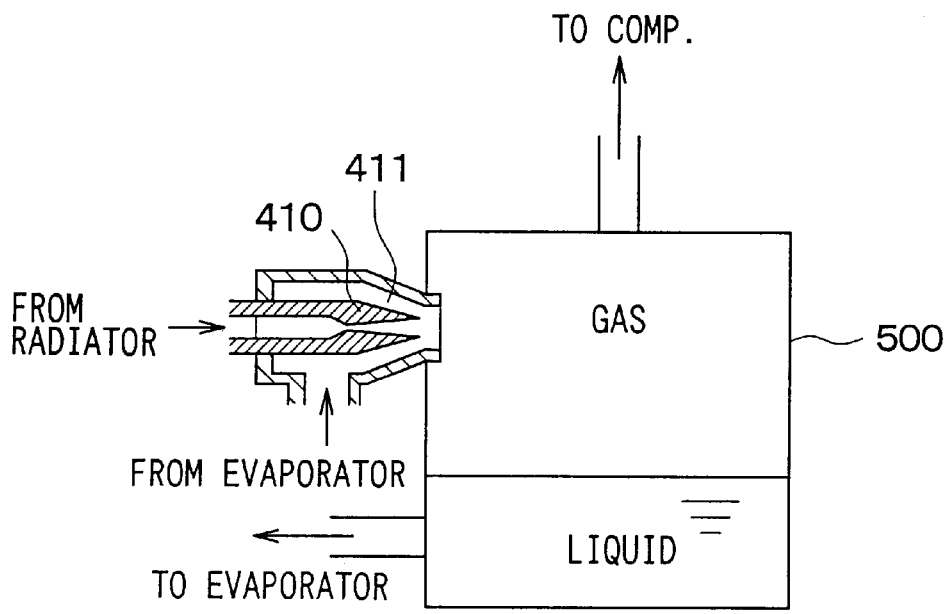
FIG. 17 is a schematic diagram of an ejector-integrated gas-liquid separator in an ejector cycle system according to a tenth preferred embodiment of the present invention.

A tenth preferred embodiment of the present invention will be now described with reference to FIG. 17. As shown in FIG. 17, a side of the refrigerant jetting port 410a of the nozzle 410 is connected to the gas-liquid separator 500 while the mixing portion 420 and the diffuser 430 (pressure-increasing portion 423) are eliminated. That is, the mixing portion 420 and the diffuser 430 (pressure-increasing portion 423) are not provided, and the side of the refrigerant jetting port 410a of the nozzle 410 is directly connected to the gas-liquid separator 500. Thereby, gas refrigerant evaporated in the evaporator 300 is sucked into the gas-liquid separator 500 by the driving refrigerant flow. Further, in the gas-liquid separator 500, the speed energy is converted to the pressure energy while the sucked refrigerant (suction refrigerant flow) from the evaporator 300 and the driving refrigerant flow from the nozzle 410 are mixed, thereby increasing refrigerant pressure. As a result, the size of the ejector cycle system can be reduced, and manufacturing cost of the ejector cycle system can be reduced.

Figure 18:
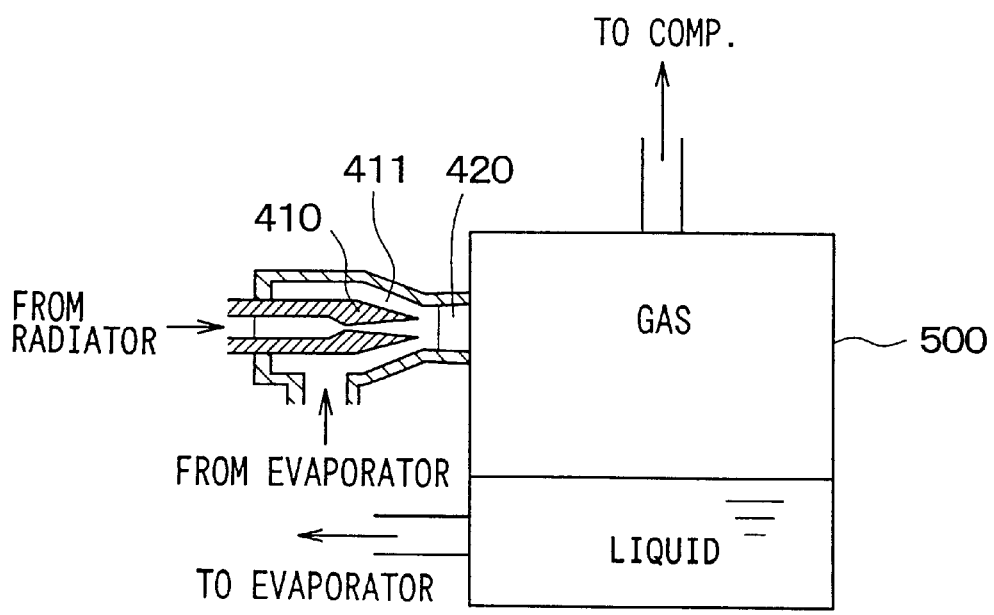
FIG. 18 is a schematic diagram of an ejector-integrated gas-liquid separator in an ejector cycle system according to an eleventh preferred embodiment of the present invention.

An eleventh preferred embodiment of the present invention will be now described with reference to FIG. 18. As shown in FIG. 18, the refrigerant outlet side of the mixing portion 420 is connected into the gas-liquid separator 500, and the speed energy of refrigerant discharged from the mixing portion 420 is converted to the pressure energy, thereby increasing refrigerant pressure in the gas-liquid separator 500. As a result, manufacturing cost of the ejector cycle system can be also reduced in the eleventh embodiment.

Figure 19:
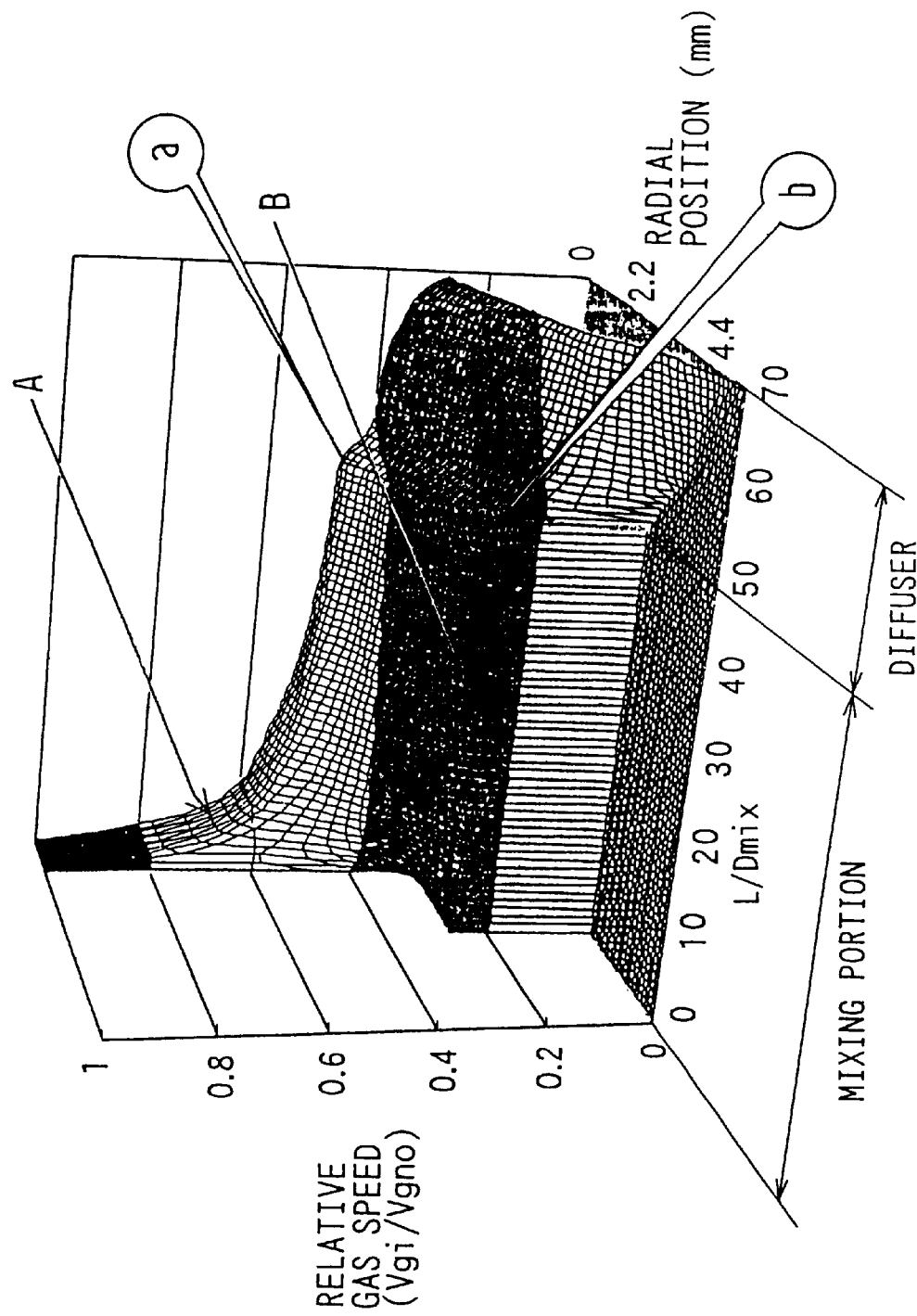
FIG. 19 is a three-dimensional characteristic view showing a relationship between a refrigerant relative flow speed from a refrigerant outlet of a nozzle to a refrigerant outlet of a diffuser of an ejector, and a radial position in a radial direction from a center in a refrigerant passage section of the ejector, according to a twelfth preferred embodiment of the present invention.

A twelfth preferred embodiment of the present invention will be now described with reference to FIGS. 19 and 20. FIG. 19 shows a simulation result showing a relationship between a refrigerant flow speed (relative speed Vgi/Vgno) from the refrigerant outlet of the nozzle 410 to the refrigerant outlet of the diffuser 430, and a radial position in a radial direction from a center in a refrigerant passage cross-section of the ejector 400. The simulation of FIG. 19 is performed, assuming that the refrigerant flow speed distribution (gas flow speed distribution) is symmetrical relative to a center axial line, and assuming that the refrigerant flow speed at the outlet of the nozzle 410 is 1. In FIG. 19, A indicates a jet-flow gas refrigerant flowing from the nozzle 410, and B indicates a suction gas refrigerant (suction flow gas) sucked from the evaporator 300. As shown in FIG. 19, the flow speed of the jet-flow gas refrigerant discharged from the nozzle 410 becomes lower while the jet-flow gas refrigerant sucks and accelerates refrigerant from the evaporator 300. Therefore, at a refrigerant outlet side of the mixing portion 420 (refrigerant inlet side of the diffuser 430), the flow speed decrease of the jet-flow gas refrigerant is nearly finished as shown by "a" in FIG. 19, and the sucked gas refrigerant from the evaporator 300 is sufficiently accelerated as shown by "b" in FIG. 19. That is, at the refrigerant outlet side of the mixing portion 420 (refrigerant inlet side of the diffuser 430), gas refrigerant discharged from the nozzle 410 and gas refrigerant sucked from the evaporator 300 are mixed so that the flow speed of the gas refrigerant sucked from the evaporator 300 becomes approximately equal to that of the gas refrigerant from the nozzle 410. The mixed refrigerant mixed in the mixing portion 420 flows into the diffuser 430, and the refrigerant pressure is increased in the diffuser 430 while the flow speed of the refrigerant is decreased.

In an ideal ejector 400, a refrigerant pressure is increased in the mixing portion 420 so that the sum of the kinetic amount of the driving flow refrigerant (jet flow refrigerant) from the nozzle 410 and the kinetic amount of the suction flow refrigerant from the evaporator 300 are maintained, and the refrigerant pressure is increased in the diffuser 430 so that the energy thereof is maintained. However, if a flow rate of the driving flow refrigerant and a flow rate of the suction flow refrigerant are not approximately equal and the flow rates thereof are greatly different from each other, it is difficult to effectively convert the speed energy to the pressure energy. Accordingly, in this case, a pressure increasing amount in the diffuser 430 is decreased. On the other hand, when a portion with the same sectional area is continued after the flow rate of the driving flow refrigerant and the flow rate of the suction flow refrigerant becomes approximately equal, the flow rate of refrigerant flowing into the diffuser 430 is decreased due to a surface friction, and therefore, the pressure increasing amount in the diffuser 430 is decreased.

Thus, in the twelfth embodiment, the length L of the mixing portion 420 is suitably selected so that refrigerant flows into the diffuser 430 after the flow rate of the suction flow refrigerant from the evaporator 300 and the flow rate of the driving flow refrigerant from the nozzle 410 becomes approximately equal. Accordingly, the ejector efficiency $\eta e$ can be further increased.

Figure 20:
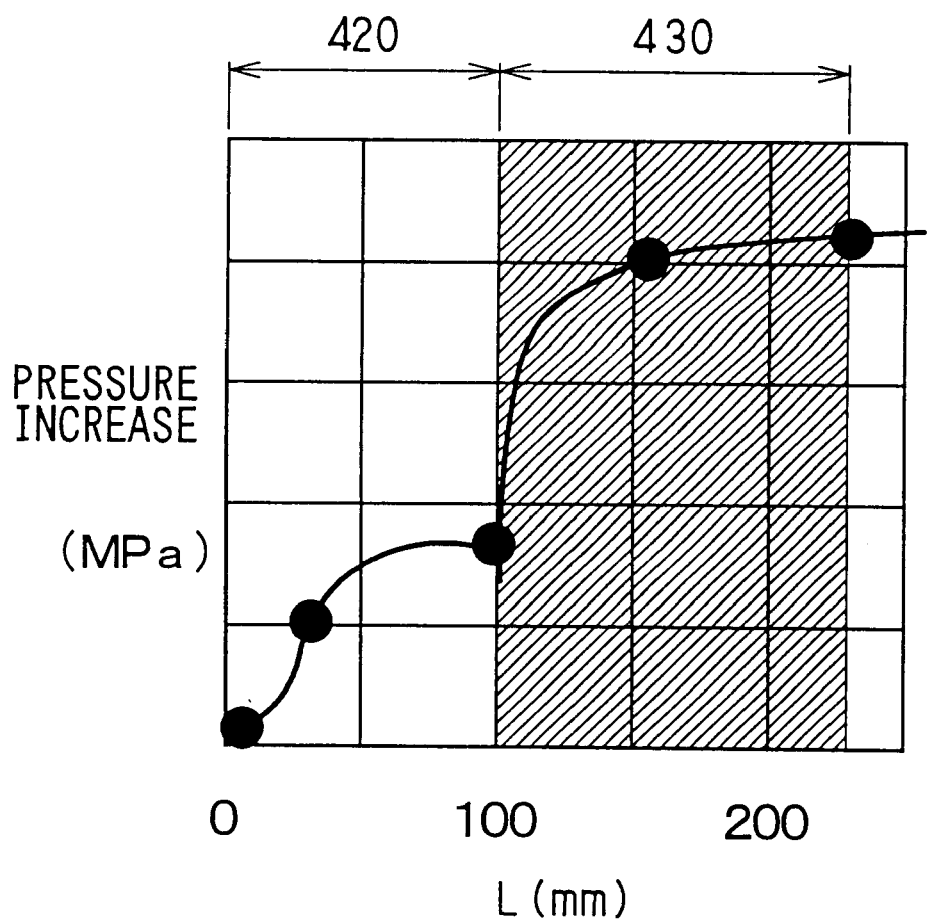
FIG. 20 is a graph showing a relationship between a pressure increase amount in the ejector and a distance L from a nozzle outlet, according to the twelfth embodiment.

As shown in FIG. 20, when the flow rate of the suction flow refrigerant and the flow rate of the driving flow refrigerant become approximately equal in the mixing portion 420, the refrigerant pressure in the mixing portion 420 becomes approximately constant, and a pressure increasing ratio becomes approximately zero. Therefore, by detecting the refrigerant pressure at the refrigerant outlet of the nozzle 410, it can determined than the flow rate of the suction flow refrigerant becomes approximately equal to that of the driving flow refrigerant.

A thirteenth preferred embodiment of the present invention will be now described with reference to FIGS. 21–24.

In the ejector 400, the refrigerant pressure is increased in the mixing portion 420 so that the sum of the kinetic amount of the driving flow refrigerant (jet flow refrigerant) from the nozzle 410 and the kinetic amount of the suction flow refrigerant from the evaporator 300 are maintained, and the refrigerant pressure is increased in the diffuser 430 so that the energy thereof is maintained. However, when the passage sectional area of the mixing portion 420 is increased for increasing the pressure increasing ratio in the mixing portion 420, an expanding amount of the passage section area is decreased in the diffuser 430, and the pressure-increasing amount in the diffuser 430 is reduced.

Accordingly, in the thirteenth embodiment, a pressure-increasing ratio $\beta$ ($\Delta Pm/\Delta P$) of a pressure-increasing amount $\Delta Pm$ in the mixing portion 420 to an entire pressure-increasing amount $\Delta P$ in the ejector 400 is set so that the ejector efficiency $\eta e$ becomes maximum. Here, the entire pressure-increasing amount $\Delta P$ is the sum of the pressure-increasing amount $\Delta Pm$ in the mixing portion 420 and the pressure-increasing amount $\Delta Pd$ in the diffuser 430.

Figure 21:
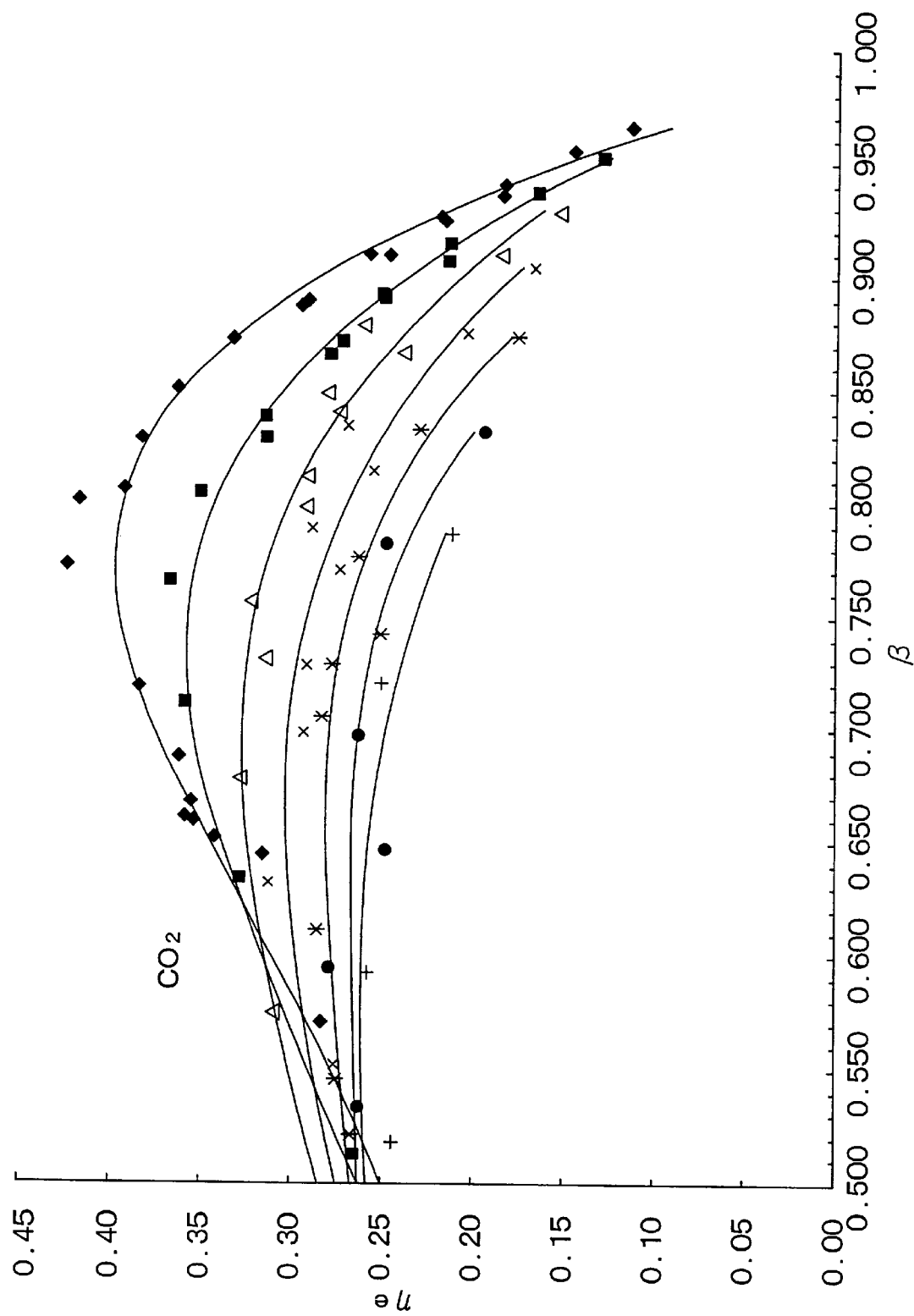
FIG. 21 is a graph showing a relationship between a pressure-increasing ratio β and an ejector efficiency ηe of an ejector cycle system, when a flow ratio α (Ge/Gn) is as a parameter and carbon dioxide is used as refrigerant, according to a thirteenth preferred embodiment.
Figure 22:
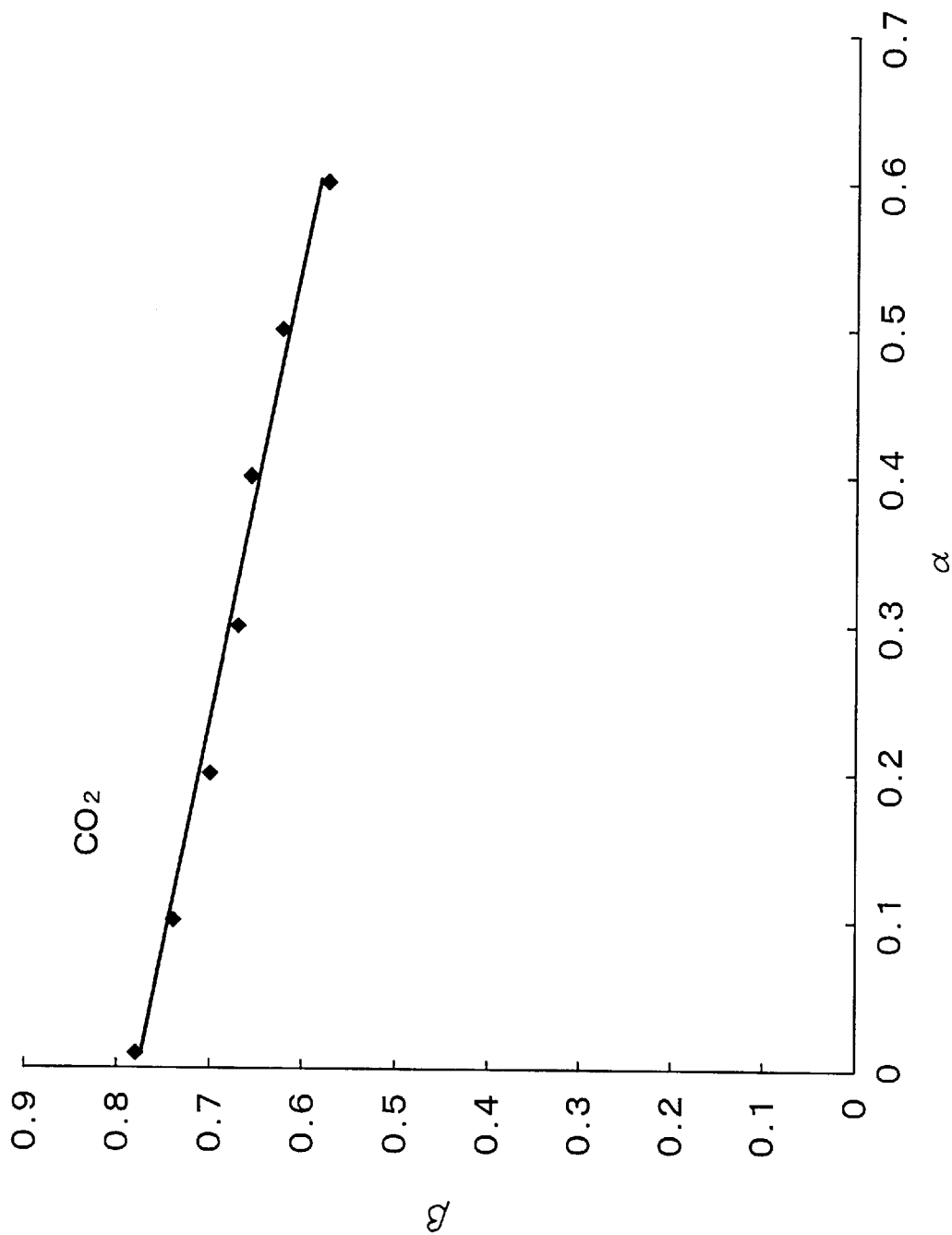
FIG. 22 is a graph showing a relationship between the pressure-increasing ratio β and the flow ratio α, at which the ejector efficiency ηe becomes maximum when carbon dioxide is used as refrigerant, according to the thirteenth embodiment.

FIG. 21 is a simulation result showing a relationship between the pressure-increasing ratio $\beta$ and the ejector efficiency $\eta e$, when a flow ratio $\alpha$ (Ge/Gn) is as a parameter, and the carbon dioxide is used as refrigerant. Here, Gn is a refrigerant flow amount flowing in the radiator 200, and Ge is a refrigerant flow amount flowing in the evaporator 300. FIG. 22 is a graph showing a relationship between the pressure-increasing ratio $\beta$ and the flow ratio $\alpha$, at which the ejector efficiency $\eta e$ becomes maximum. In the simulation of FIG. 22, carbon dioxide is used as refrigerant, and the outside air temperature is changed in a range of 15° C.–45° C.

Figure 23:
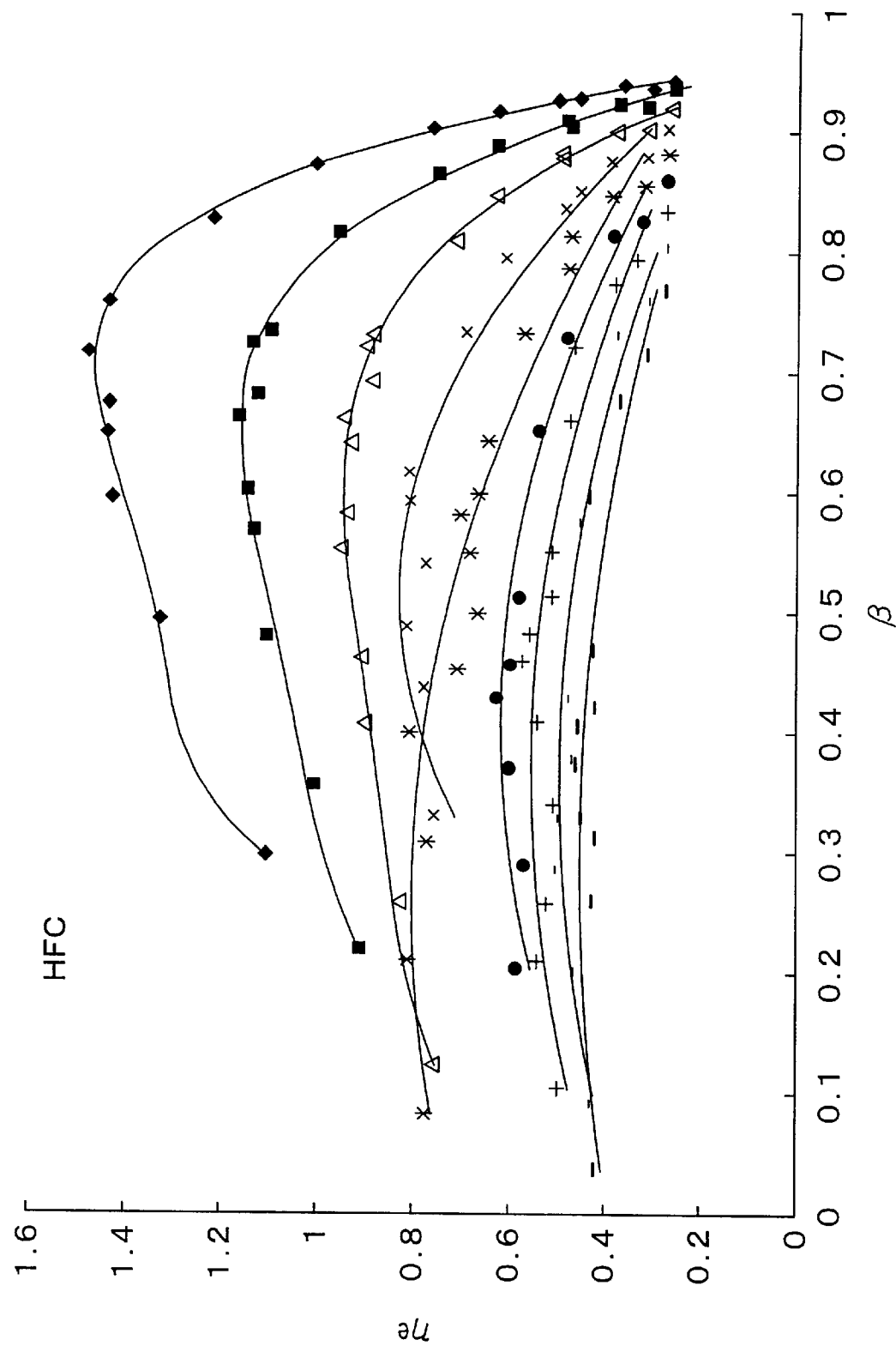
FIG. 23 is a graph showing a relationship between the pressure-increasing ratio β and the ejector efficiency ηe of the ejector cycle system, when the flow ratio α (Ge/Gn) is as a parameter and HFC is used as refrigerant, according to the thirteenth embodiment.
Figure 24:
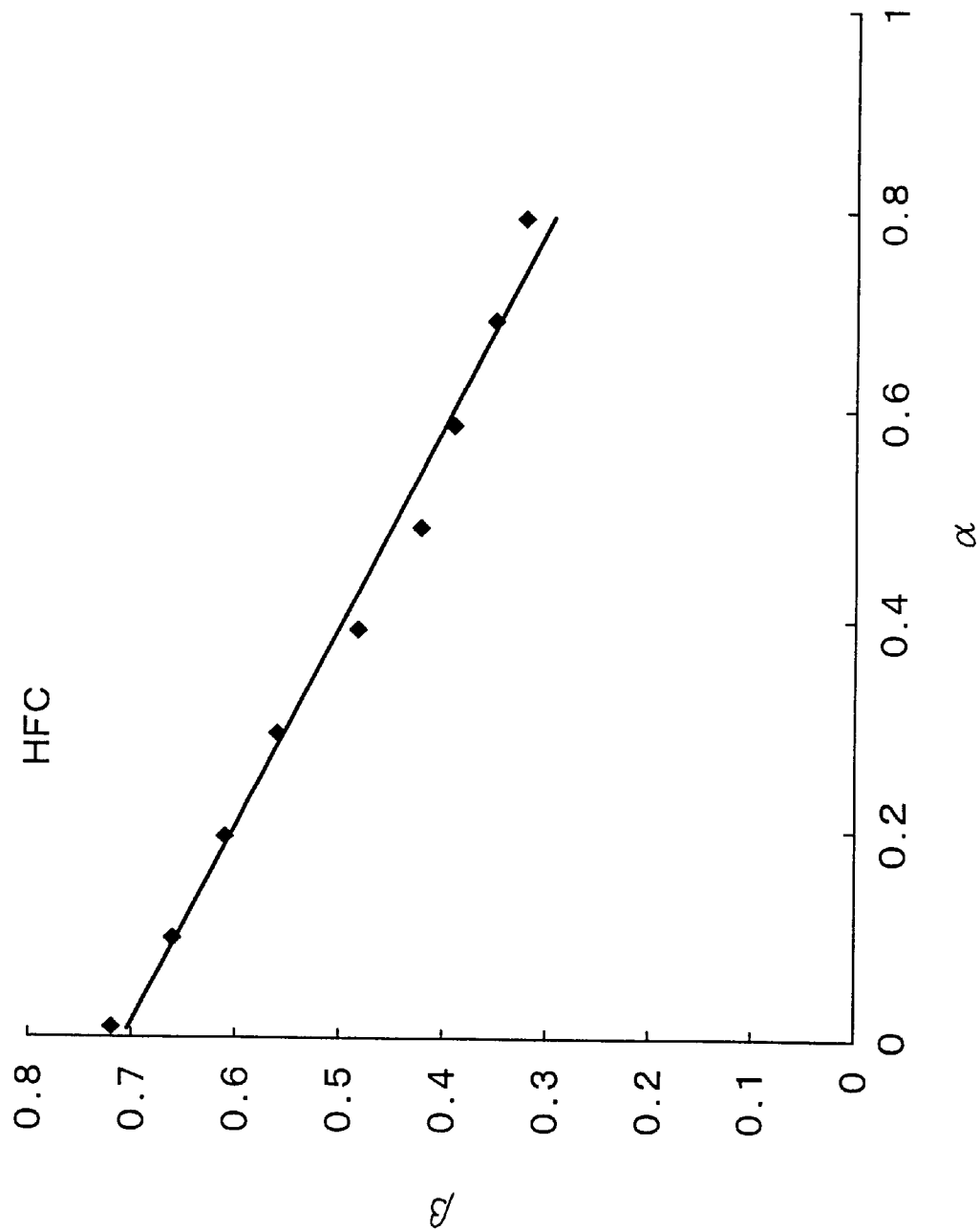
FIG. 24 is a graph showing a relationship between the pressure-increasing ratio β and the flow ratio α, at which the ejector efficiency ηe becomes maximum when HFC is used as refrigerant, according to the thirteenth embodiment.

Further, FIG. 23 is a simulation result, showing a relationship between the pressure-increasing ratio $\beta$ and the ejector efficiency $\eta e$, when the flow ratio $\alpha$ (Ge/Gn) is as a parameter, and when HFC is used as refrigerant. FIG. 24 is a graph showing a relationship between the pressure-increasing ratio $\beta$ and the flow ratio $\alpha$, at which the ejector efficiency $\eta e$ becomes maximum. In the simulation of FIG. 24, HFC is used as refrigerant, and the outside air temperature is changed in a range of –20° C. and 45° C.

As shown in FIGS. 21–24, when carbon dioxide is used as refrigerant, the pressure-increasing ratio $\beta$ is set to be equal to or more than 50%. In this case, when the pressure-increasing ratio $\beta$ is set in a range of 55%–80%, the ejector efficiency $\eta e$ can be further improved. On the other hand, when HFC freon is used as refrigerant, the pressure-increasing ratio $\beta$ is set to be equal to or more than 30%. In this case, when the pressure-increasing ratio $\beta$ is set in a range of 35%–80%, the ejector efficiency $\eta e$ can be further improved.

In the above-described embodiments, carbon dioxide or flon is used as refrigerant. However, as the refrigerant, ethylene, ethane, nitrogen oxide, hydrocarbon group refrigerant such as propane, or mixing refrigerant such as HFC-404A, HFC-407 or HFC-410 can be used.

A fourteenth preferred embodiment of the present invention will be now described with reference to FIGS. 25 and 26. In the fourteenth embodiment, a mixing refrigerant HFC-404A (R404A) is typically used as refrigerant. In the fourth embodiment, the structure of the ejector cycle system is similar to that of the above-described first embodiment, and the explanation thereof is omitted.

Figure 25:
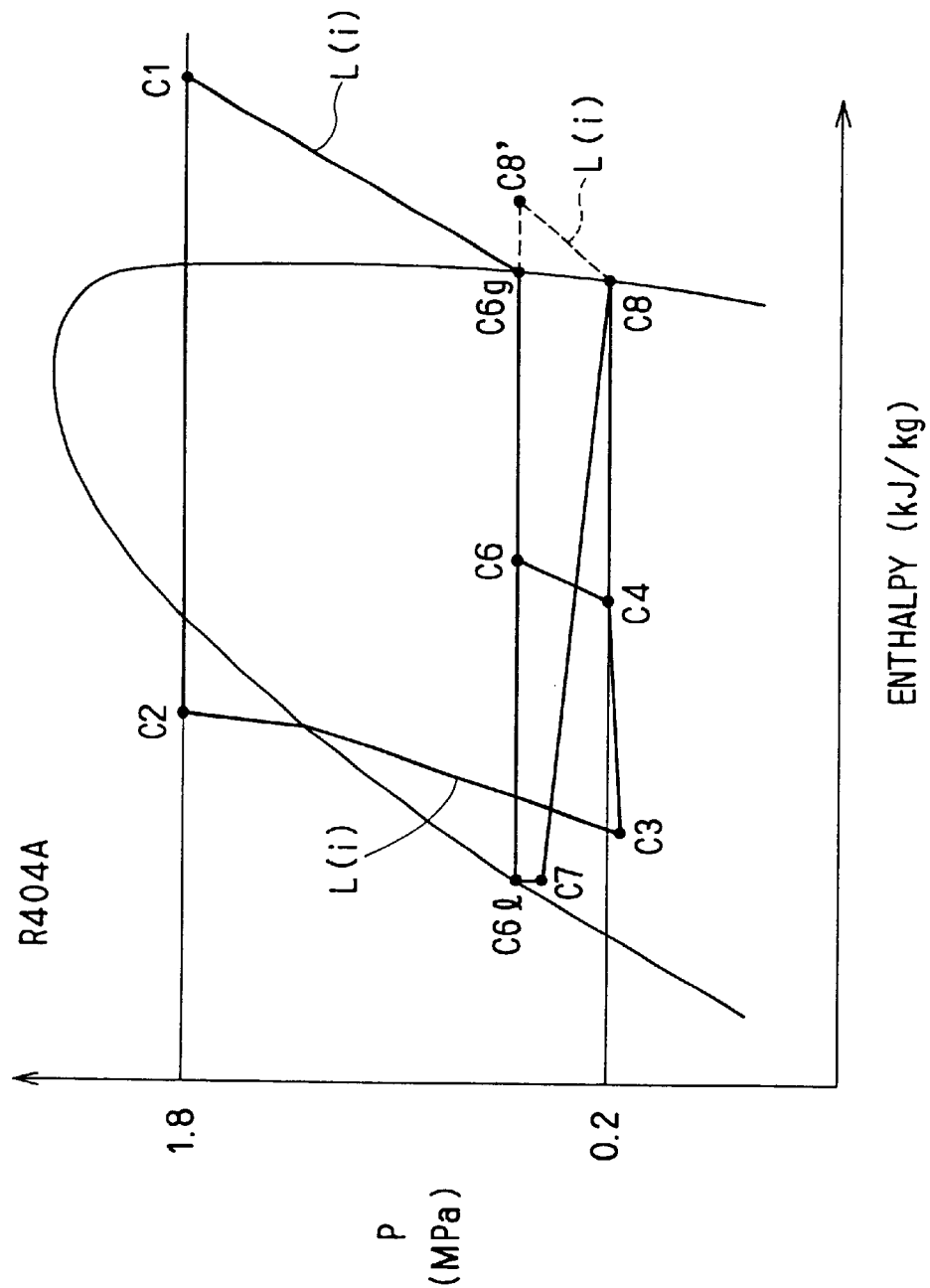
FIG. 25 is a Mollier diagram (p-h diagram) of an ejector cycle system when a mixing refrigerant HFC-404A (R404A) is used as refrigerant, according to a fourteenth preferred embodiment of the present invention.

FIG. 25 shows a p-h diagram of the ejector cycle system when the mixing refrigerant HFC-404A (R404A) is used as refrigerant. In FIG. 25, refrigerant states at different positions (e.g., C1, C2 . . . ) shown in FIG. 1 are indicated. Further, line L(i) indicates the isentropic curve. As shown in FIG. 25, the mixing refrigerant HFC-404A is decompressed along the isentropic change curve in the ejector 400 (nozzle 410). Therefore, it is compared with a general vapor-compression refrigerant cycle, the dryness of refrigerant immediately after decompression can be made smaller. That is, refrigerant discharged from the ejector 400 has a large liquid refrigerant ratio. Accordingly, gas-liquid refrigerant having a small dryness can be supplied from the ejector 400 into the gas-liquid separator 500.

Thus, a gas refrigerant ratio contained in refrigerant to be supplied from the gas-liquid separator 500 to the evaporator 300 can be made greatly small, and a change range of a pressure loss generated while refrigerant is supplied from the gas-liquid separator 500 to the evaporator 300 can be made smaller. Accordingly, a pressure change in the evaporator 300 can be made smaller, and a refrigerant temperature change (evaporation temperature change) in the evaporator 300 can be made smaller. As a result, refrigerating capacity (heat-absorbing capacity) in the evaporator 300 can be improved.

When a single refrigerant (e.g., HFC-134a (R134a)) is used, the adiabatic heat drop (nozzle efficiency) between upstream and downstream sides of the nozzle 410 becomes smaller, as compared with the fourteenth embodiment where the mixing refrigerant HFC-404A is used.

Plural kinds of refrigerant materials having different boiling points are mixed so that the mixing refrigerant is obtained. Therefore, when the mixing refrigerant is used, the temperature within the evaporator 300 readily becomes higher. However, in the fourteenth embodiment, even when the mixing refrigerant HFC-404A (R404A) is used, because the pressure change in the evaporator 300 can be made smaller, it can sufficiently restrict the temperature within the evaporator 300 from being increased.

Figure 26:
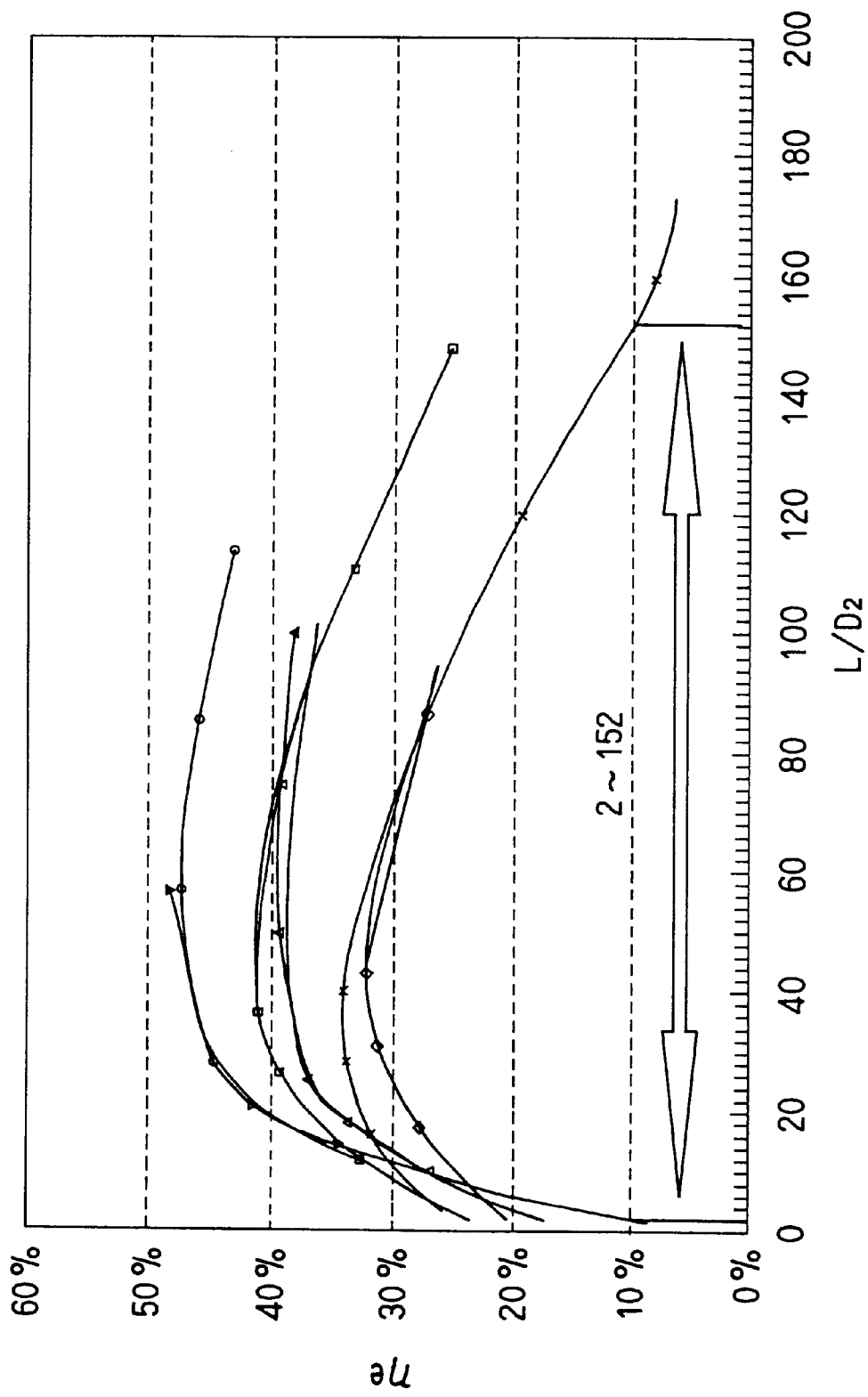
FIG. 26 is a graph showing a relationship between a ratio L/D2 of a mixing portion and an ejector efficiency ηe an ejector cycle system, according to the fourteenth embodiment.

FIG. 26 is a simulation result, showing a relationship between the ratio L/D2 of the mixing portion 420 and the ejector efficiency ηe, when the flow ratio α (Ge/Gn) is as a parameter, and when the mixing refrigerant HFC-404A (R404A) is used as refrigerant. As shown in FIG. 26, when the ratio L/D2 is set in a rage of 2–152 and the extension angle θd is set in a range of 0.2–70 degrees, the ejector efficiency ηe can be made equal to or larger than 10%.

In the fourteenth embodiment, the mixing refrigerant HFC-404A (R404A) is used. However, the other mixing refrigerant such as HFC-407 (R407) and HFC-410 (R410) can be used. Even in this case, the ejector efficiency ηe can be improved by suitably setting each dimension of the mixing portion 420.

Although the present invention has been fully described in connection with the preferred embodiments thereof with reference to the accompanying drawings, it is to be noted that various changes and modifications will become apparent to those skilled in the art.

Figure 27:
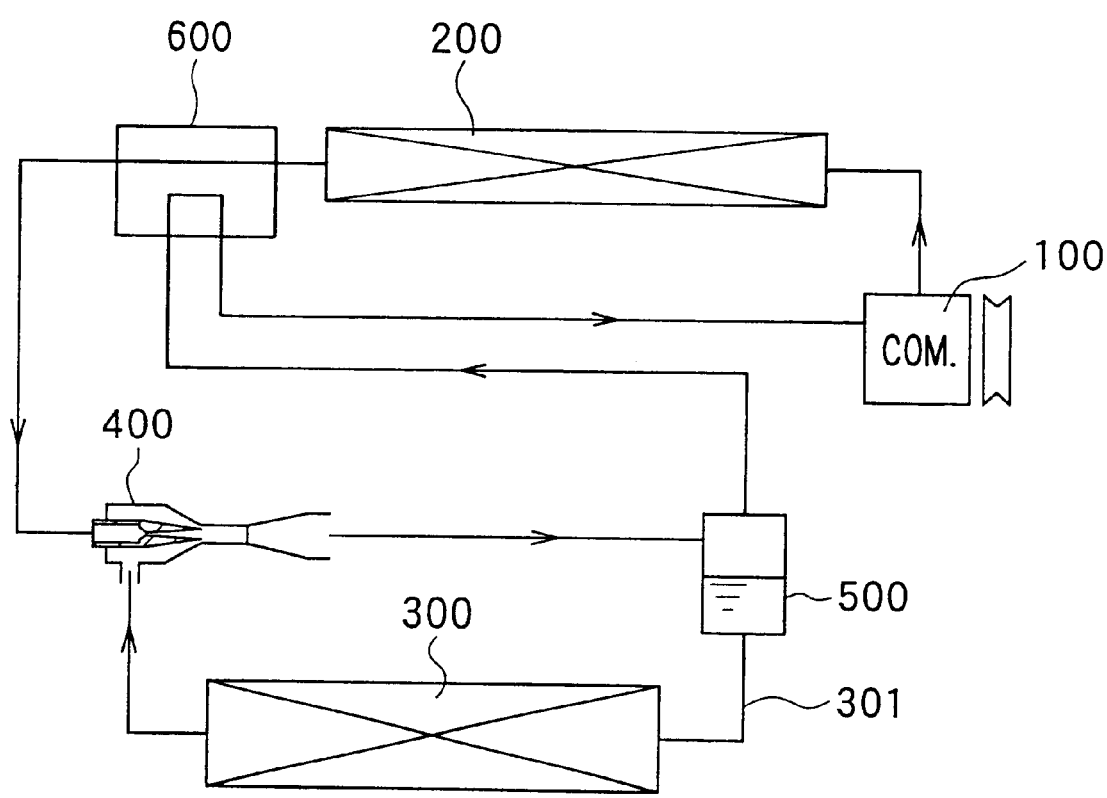
FIG. 27 is a schematic diagram showing an ejector cycle system according to a modification of the present invention.

For example, as shown in FIG. 27, in the ejector cycle, an inner heat exchanger 600, in which refrigerant discharged from the condenser 200 and refrigerant to be sucked into the compressor 100 is heat-exchanged, can be provided.

Such changes and modifications are to be understood as being within the scope of the present invention as defined by the appended claims.

What is claimed is:

1. An ejector cycle system comprising:
a compressor for sucking and compressing refrigerant;
a radiator for cooling refrigerant discharged from the compressor;
an evaporator in which refrigerant is evaporated by absorbing heat;
an ejector having a nozzle in which a pressure energy of high-pressure side refrigerant flowing from the radiator is converted to a speed energy so that refrigerant is decompressed and expanded, and a pressure-increasing portion in which the speed energy is converted to the pressure energy so that the pressure of refrigerant is increased while refrigerant discharged from the nozzle and refrigerant sucked from the evaporator are mixed; and
a gas-liquid separator for storing refrigerant and for separating refrigerant into gas refrigerant and liquid refrigerant, wherein:
the nozzle is a divergent nozzle having therein a throat portion at which a passage sectional area becomes smallest in a refrigerant passage of the divergent nozzle;
the divergent nozzle has a first dimension between the throat portion and an outlet of the nozzle, and a second dimension between the throat portion and an upstream portion upstream from the throat portion, from which the passage sectional area becomes smaller in the refrigerant passage of the divergent nozzle, the first dimension being larger than the second dimension;
the pressure-increasing portion has a length in a refrigerant flow direction and a smallest equivalent diameter, and a ratio of the length to the smallest equivalent diameter is equal to or smaller than 120; and
a ratio of the smallest equivalent diameter of the pressure-increasing portion to an equivalent diameter at the outlet of the nozzle is in a range of 1.05–10.

2. The ejector cycle system according to claim 1, wherein the refrigerant is carbon dioxide.

3. The ejector cycle system according to claim 1, wherein the pressure-increasing portion has a shape so that refrigerant changes substantially along an isentropic curve from a refrigerant inlet to a refrigerant outlet of the pressure-increasing portion.

4. The ejector cycle system according to claim 1, wherein:
the pressure-increasing portion has a refrigerant passage with a passage section area; and
the passage sectional area is approximately constant from an upstream side to a downstream side in the refrigerant passage of the pressure-increasing portion.

5. The ejector cycle system according to claim 1, wherein:
the pressure-increasing portion has a refrigerant passage with a passage section area; and
the passage sectional area is gradually increased from an upstream side to a downstream side in the refrigerant passage of the pressure-increasing portion.

6. The ejector cycle system according to claim 5, wherein the pressure-increasing portion has an extension angle θd which is defined by an inside wall surface of the pressure-increasing portion and a reference line parallel to a center axial line of the pressure-increasing portion, and the extension angle is equal to or lower than 4 degrees.

7. The ejector cycle system according to claim 1, wherein the nozzle is constructed by a nozzle group having a plurality of nozzle parts.

8. The ejector cycle system according to claim 1, wherein the refrigerant is a mixing refrigerant obtained by mixing plural refrigerant materials.

9. The ejector cycle system according to claim 8, wherein the mixing refrigerant is HFC-404A.

10. The ejector cycle system according to claim 8, wherein the mixing refrigerant is HFC-407.

11. The ejector cycle system according to claim 8, wherein the mixing refrigerant is HFC-410.

12. An ejector cycle system comprising:
a compressor for sucking and compressing refrigerant;
a radiator for cooling refrigerant discharged from the compressor;
an evaporator in which refrigerant is evaporated by absorbing heat;
an ejector having a nozzle in which a pressure energy of high-pressure side refrigerant flowing from the radiator is converted to a speed energy so that refrigerant is decompressed and expanded, a mixing portion in which gas refrigerant evaporated in the evaporator is sucked by a high-speed refrigerant flow ejected from the nozzle, and a diffuser in which the speed energy is converted to a pressure energy so that the pressure of refrigerant is increased while refrigerant discharged from the nozzle and refrigerant sucked from the evaporator are mixed; and
a gas-liquid separator for storing refrigerant and for separating refrigerant into gas refrigerant and liquid refrigerant, wherein:
the nozzle is a divergent nozzle having therein a throat portion at which a passage sectional area becomes smallest in a refrigerant passage of the divergent nozzle;
the divergent nozzle has a first dimension between the throat portion and an outlet of the nozzle, and a second dimension between the throat portion and an upstream portion upstream from the throat portion, from which the passage sectional area becomes smaller in the refrigerant passage of the divergent nozzle, the first dimension being larger than the second dimension;
the mixing portion has a length in a refrigerant flow direction and an equivalent diameter, and a ratio of the length to the equivalent diameter is equal to or smaller than 120; and
a ratio of the equivalent diameter of the mixing portion to an equivalent diameter at the outlet of the nozzle is in a range of 1.05–10.

13. The ejector cycle system according to claim 12, wherein:
the refrigerant is carbon dioxide; and
the ratio of the equivalent diameter of the mixing portion to the equivalent diameter at the outlet of the nozzle is in a range of 1.3–5.3.

14. The ejector cycle system according to claim 12, wherein:
the refrigerant is freon; and
the ratio of the equivalent diameter of the mixing portion to the equivalent diameter at the outlet of the nozzle is in a range of 1.05–4.5.

15. The ejector cycle system according to claim 12, wherein:
the diffuser has a refrigerant passage with a passage section area;
the passage sectional area is gradually increased from an upstream side to a downstream side in the refrigerant passage of the diffuser; and
the diffuser has an extension angle $\theta d$ which is defined by an inside wall surface of the diffuser and a reference line parallel to a center axial line of the diffuser, the extension angle $\theta d$ of the diffuser is in a range of 0.2–34 degrees.

16. The ejector cycle system according to claim 15, wherein the extension angle $\theta d$ of the diffuser is in a range of 0.2–7 degrees.

17. The ejector cycle system according to claim 12, wherein:
the nozzle has a contraction angle $\theta n1$ at a refrigerant inlet side upstream from the throat portion, and an extension angle $\theta n2$ at a refrigerant outlet side downstream from the throat portion; and
the contraction angle $\theta n1$ is in a range of 0.05–20 degrees, and the extension angle $\theta n2$ is in a range of 0.05–17.5 degrees.

18. The ejector cycle system according to claim 12, wherein the nozzle has a shape so that refrigerant changes substantially along an isentropic curve from a refrigerant inlet to a refrigerant outlet of the nozzle.

19. The ejector cycle system according to claim 12, wherein the nozzle is constructed by a nozzle group having a plurality of nozzle parts, the system further comprising
a valve for controlling a flow amount of refrigerant flowing into the nozzle group.

20. The ejector cycle system according to claim 19, wherein the valve has a plurality of valve parts which independently control the flow amount of refrigerant flowing into the nozzle parts, respectively.

21. The ejector cycle system according to claim 19, wherein the nozzle parts are concentrically arranged.

22. The ejector cycle system according to claim 12, wherein the refrigerant is a mixing refrigerant obtained by mixing plural refrigerant materials.

23. The ejector cycle system according to claim 22, wherein the mixing refrigerant is HFC-404A.

24. The ejector cycle system according to claim 22, wherein the mixing refrigerant is HFC-407.

25. The ejector cycle system according to claim 22, wherein the mixing refrigerant is HFC-410.

26. An ejector cycle system comprising:
a compressor for sucking and compressing refrigerant;
a radiator for cooling refrigerant discharged from the compressor;
an evaporator in which refrigerant is evaporated by absorbing heat;
a nozzle in which a pressure energy of high-pressure side refrigerant flowing from the radiator is converted to a speed energy so that refrigerant is decompressed and expanded; and
a gas-liquid separator for storing refrigerant and for separating refrigerant into gas refrigerant and liquid refrigerant, wherein:
the nozzle has a refrigerant ejecting port from which refrigerant is ejected;
the refrigerant ejecting port of the nozzle is directly connected to and is opened into the gas-liquid separator;
gas refrigerant in the evaporator is sucked by a high-speed refrigerant flow ejected from the nozzle; and
the speed energy of refrigerant in the nozzle is converted to the pressure energy while refrigerant discharged from the nozzle and refrigerant sucked from the evaporator are mixed within the gas-liquid separator.

27. An ejector cycle system comprising:

a compressor for sucking and compressing refrigerant;

a radiator for cooling refrigerant discharged from the compressor;

an evaporator in which refrigerant is evaporated by absorbing heat;

a nozzle in which a pressure energy of high-pressure side refrigerant flowing from the radiator is converted to a speed energy so that refrigerant is decompressed and expanded;

a mixing portion, in which gas refrigerant evaporated in the evaporator is sucked by a high-speed refrigerant flow ejected from the nozzle, and refrigerant discharged from the nozzle and refrigerant sucked from the evaporator are mixed;

a gas-liquid separator for storing refrigerant and for separating refrigerant into gas refrigerant and liquid refrigerant, wherein:

the mixing portion has a constant diameter and defines a refrigerant outlet from which refrigerant flows out;

refrigerant outlet of the mixing portion is directly connected to and is opened into the gas-liquid separator; and within the gas-liquid separator, the speed energy of refrigerant flowing from the mixing portion is converted to the pressure energy to increase refrigerant pressure.

28. An ejector cycle system comprising:

a compressor for sucking and compressing refrigerant;

a radiator for cooling refrigerant discharged from the compressor;

an evaporator in which refrigerant is evaporated by absorbing heat; and an ejector having a first nozzle in which a pressure energy of high-pressure side refrigerant flowing from the radiator is converted to a speed energy so that refrigerant is decompressed and expanded, a second nozzle disposed around the first nozzle in such a manner that refrigerant from the evaporator is sucked and is ejected by a refrigerant flow ejected from the first nozzle, and a pressure-increasing portion in which the speed energy is converted to the pressure energy so that the pressure of refrigerant is increased while refrigerant ejected from the first nozzle and refrigerant ejected from the second nozzle are mixed, wherein:

the first nozzle has a first injecting port from which refrigerant from the radiator is injected, and the second nozzle has a second injecting port from which refrigerant from the evaporator is injected; and the first injecting port and the second injecting port are provided at an approximately equal position in a refrigerant passage of the ejector in a refrigerant flow direction.

29. An ejector cycle system comprising:

a compressor for sucking and compressing refrigerant;

a radiator for cooling refrigerant discharged from the compressor;

an evaporator in which refrigerant is evaporated by absorbing heat;

an ejector having a nozzle in which a pressure energy of high-pressure side refrigerant flowing from the radiator is converted to a speed energy so that refrigerant is decompressed and expanded, a mixing portion in which gas refrigerant evaporated in the evaporator is sucked by a high-speed refrigerant flow ejected from the nozzle to be mixed with refrigerant ejected from the nozzle, and a diffuser in which the speed energy is converted to the pressure energy so that the pressure of refrigerant is increased; and a gas-liquid separator for storing refrigerant and for separating refrigerant into gas refrigerant and liquid refrigerant; wherein:

the ejector is constructed in such a manner that refrigerant from the mixing portion flows into the diffuser after a flow rate of refrigerant sucked from the evaporator and a flow rate of refrigerant ejected from the nozzle becomes approximately equal in the mixing portion;

the nozzle is a divergent nozzle having therein a throat portion at which a passage sectional area becomes smallest in a refrigerant passage of the divergent nozzle;

the divergent nozzle has a first dimension between the throat portion and an outlet of the nozzle, and a second dimension between the throat portion and an upstream portion upstream from the throat portion, from which the passage sectional area becomes smaller in the refrigerant passage of the divergent nozzle, the first dimension being larger than the second dimension;

the mixing portion has a length in a refrigerant flow direction and an equivalent diameter, and a ratio of the length to the equivalent diameter is equal to or smaller than 120; and a ratio of the equivalent diameter of the pressure-increasing portion to an equivalent diameter at the outlet of the nozzle is in a range of 1.05–10.

30. The ejector cycle system according to claim 29, wherein:

the refrigerant is carbon dioxide; and the ratio of the equivalent diameter of the mixing portion to the equivalent diameter at the outlet of the nozzle is in a range of 1.3–5.3.

31. The ejector cycle system according to claim 29, wherein:

the refrigerant is flon; and the ratio of the equivalent diameter of the mixing portion to the equivalent diameter at the outlet of the nozzle is in a range of 1.05–4.5.

32. The ejector cycle system according to claim 29, wherein:

the diffuser has a refrigerant passage with a passage section area;

the passage sectional area is gradually increased from an upstream side to a downstream side in the refrigerant passage of the diffuser; and the diffuser has an extension angle $\theta d$ which is defined by an inside wall surface of the diffuser and a reference line parallel to a center axial line of the diffuser, the extension angle $\theta d$ of the diffuser is in a range of 0.2–34 degrees.

33. The ejector cycle system according to claim 32, wherein the extension angle $\theta d$ of the diffuser is in a range of 0.2–7 degrees.

34. An ejector cycle system comprising:

a compressor for sucking and compressing refrigerant;

a radiator for cooling refrigerant discharged from the compressor;

an evaporator in which refrigerant is evaporated by absorbing heat;

an ejector having a nozzle in which a pressure energy of high-pressure side refrigerant flowing from the radiator is converted to a speed energy so that refrigerant is decompressed and expanded, a mixing portion in which gas refrigerant evaporated in the evaporator is sucked by a high-speed refrigerant flow ejected from the nozzle to be mixed with refrigerant ejected from the nozzle, and a diffuser in which the speed energy is converted to the pressure energy so that the pressure of refrigerant is increased; and a gas-liquid separator for storing refrigerant and for separating refrigerant into gas refrigerant and liquid refrigerant; wherein:

the ejector is constructed in such a manner that refrigerant from the mixing portion flows into the diffuser after a flow rate of refrigerant sucked from the evaporator and a flow rate of refrigerant ejected from the nozzle becomes approximately equal in the mixing portion;

the nozzle is constructed by a nozzle group having a plurality of nozzle parts, the system further comprising a valve for controlling a flow amount of refrigerant flowing into the nozzle group.

35. The ejector cycle system according to claim 34, wherein the valve has a plurality of valve parts which independently control the flow amount of refrigerant flowing into the nozzle parts, respectively.

36. The ejector cycle system according to claim 34, wherein the nozzle parts are concentrically arranged.

37. An ejector cycle system comprising:

a compressor for sucking and compressing refrigerant;

a radiator for cooling refrigerant discharged from the compressor;

an evaporator in which refrigerant is evaporated by absorbing heat;

an ejector having a nozzle in which a pressure energy of high-pressure side refrigerant flowing from the radiator is converted to a speed energy so that refrigerant is decompressed and expanded, a mixing portion in which gas refrigerant evaporated in the evaporator is sucked by a high-speed refrigerant flow ejected from the nozzle to be mixed with refrigerant ejected from the nozzle, and a diffuser in which the speed energy is converted to the pressure energy so that the pressure of refrigerant is increased; and a gas-liquid separator for storing refrigerant and for separating refrigerant into gas refrigerant and liquid refrigerant; wherein:

the ejector is constructed in such a manner that refrigerant from the mixing portion flows into the diffuser after a flow rate of refrigerant sucked from the evaporator and a flow rate of refrigerant ejected from the nozzle becomes approximately equal in the mixing portion;

the refrigerant is a mixing refrigerant obtained by mixing plural refrigerant materials.

38. The ejector cycle system according to claim 37, wherein the mixing refrigerant is HFC-404A.

39. The ejector cycle system according to claim 37, wherein the mixing refrigerant is HFC-407.

40. The ejector cycle system according to claim 37, wherein the mixing refrigerant is HFC-410.

41. An ejector cycle system comprising:

a compressor for sucking and compressing refrigerant;

a radiator for cooling refrigerant discharged from the compressor;

an evaporator in which refrigerant is evaporated by absorbing heat;

an ejector having a nozzle in which a pressure energy of high-pressure side refrigerant flowing from the radiator is converted to a speed energy so that refrigerant is decompressed and expanded, a mixing portion in which gas refrigerant evaporated in the evaporator is sucked by a high-speed refrigerant flow ejected from the nozzle to be mixed with refrigerant ejected from the nozzle, and a diffuser in which the speed energy of refrigerant from the mixing portion is converted to the pressure energy so that the pressure of refrigerant is increased; and a gas-liquid separator for storing refrigerant and for separating refrigerant into gas refrigerant and liquid refrigerant, wherein, the ejector is constructed so that a pressure-increasing ratio of a pressure-increasing amount in the mixing portion to an entire pressure-increasing amount in the ejector is set to be equal to or larger than 50% when carbon dioxide is used as refrigerant.

42. The ejector cycle system according to claim 41, wherein the pressure-increasing ratio of the pressure-increasing amount in the mixing portion to the entire pressure-increasing amount in the ejector is set in a range of 55–80% when carbon dioxide is used as refrigerant.

43. An ejector cycle system comprising:

a compressor for sucking and compressing refrigerant;

a radiator for cooling refrigerant discharged from the compressor;

an evaporator in which refrigerant is evaporated by absorbing heat;

an ejector having a nozzle in which a pressure energy of high-pressure side refrigerant flowing from the radiator is converted to a speed energy so that refrigerant is decompressed and expanded, a mixing portion in which gas refrigerant evaporated in the evaporator is sucked by a high-speed refrigerant flow ejected from the nozzle to be mixed with refrigerant ejected from the nozzle, and a diffuser in which the speed energy of refrigerant from the mixing portion is converted to the pressure energy so that the pressure of refrigerant is increased; and a gas-liquid separator for storing refrigerant and for separating refrigerant into gas refrigerant and liquid refrigerant, wherein, the ejector is constructed so that a pressure-increasing ratio of a pressure-increasing amount in the mixing portion to an entire pressure-increasing amount in the ejector is set to be equal to or larger than 30% when freon is used as refrigerant.

44. The ejector cycle system according to claim 43, wherein the pressure-increasing ratio of the pressure-increasing amount in the mixing portion to the entire pressure-increasing amount in the ejector is set in a range of 35–80% when freon is used as refrigerant.

45. The ejector cycle system according to claim 41, wherein:

the nozzle is a divergent nozzle having therein a throat portion at which a passage sectional area becomes smallest in a refrigerant passage of the divergent nozzle; and the divergent nozzle has a first dimension (B) between the throat portion and an outlet of the nozzle, and a second dimension (A) between the throat portion and an upstream portion upstream from the throat portion, from which the passage sectional area becomes smaller in the refrigerant passage of the divergent nozzle, the first dimension being larger than the second dimension.

46. The ejector cycle system according to claim 45, wherein:

the mixing portion has a length (L) in a refrigerant flow direction and an equivalent diameter (D2), and a ratio (L/D2) of the length to the equivalent diameter is equal to or smaller than 120; and a ratio (D2/D1) of the equivalent diameter of the mixing portion to an equivalent diameter at the outlet of the nozzle is in a range of 1.05–10.

47. The ejector cycle system according to claim 46, wherein the ratio of the equivalent diameter of the mixing portion to the equivalent diameter at the outlet of the nozzle is in a range of 1.3–5.3.

48. The ejector cycle system according to claim 43, wherein:

the nozzle is a divergent nozzle having therein a throat portion at which a passage sectional area becomes smallest in a refrigerant passage of the divergent nozzle; and the divergent nozzle has a first dimension (B) between the throat portion and an outlet of the nozzle, and a second dimension (A) between the throat portion and an upstream portion upstream from the throat portion, from which the passage sectional area becomes smaller in the refrigerant passage of the divergent nozzle, the first dimension being larger than the second dimension.

49. The ejector cycle system according to claim 48, wherein:

the mixing portion has a length (L) in a refrigerant flow direction and an equivalent diameter (D2), and a ratio (L/D2) of the length to the equivalent diameter is equal to or smaller than 120; and a ratio (D2/D1) of the equivalent diameter of the mixing portion to an equivalent diameter at the outlet of the nozzle is in a range of 1.05–10.

50. The ejector cycle system according to claim 49, wherein the ratio of the equivalent diameter of the mixing portion to the equivalent diameter at the outlet of the nozzle is in a range of 1.05–4.5.

* * * * *